US007337870B2

(12) United States Patent
Izukura et al.

(10) Patent No.: US 7,337,870 B2
(45) Date of Patent: Mar. 4, 2008

(54) WORKING VEHICLE WITH HYDRAULIC CONTINUOUSLY VARIABLE TRANSMISSION

(75) Inventors: Motoki Izukura, Sakai (JP); Akiyoshi Ono, Izumi (JP); Megumi Sawai, Izumi (JP); Masayori Kajino, Hashimoto (JP)

(73) Assignee: Kubota Corporation, Osaka (JP)

(*) Notice: Subject to any disclaimer, the term of this patent is extended or adjusted under 35 U.S.C. 154(b) by 0 days.

(21) Appl. No.: 11/225,824

(22) Filed: Sep. 13, 2005

(65) Prior Publication Data

US 2006/0054377 A1 Mar. 16, 2006

(30) Foreign Application Priority Data

Sep. 15, 2004 (JP) .............................. 2004-268299
Sep. 29, 2004 (JP) .............................. 2004-283591
Oct. 22, 2004 (JP) .............................. 2004-308231

(51) Int. Cl.
*B60K 17/00* (2006.01)

(52) U.S. Cl. .................... 180/307; 180/6.34; 74/473.17

(58) Field of Classification Search ................ 180/307, 180/305, 337, 364, 53.62, 291, 292, 6.2, 180/6.34; 74/15.63, 481, 560, 473.16, 334, 74/473.17, 473.11

See application file for complete search history.

(56) References Cited

U.S. PATENT DOCUMENTS 3,313,174 A * 4/1967 Walker et al. ........... 74/473.17
3,898,891 A * 8/1975 Colloton .................. 74/473.16
4,040,306 A * 8/1977 Jensen ..................... 74/473.16
4,341,129 A * 7/1982 Bando ......................... 74/481
4,523,489 A * 6/1985 Gault ...................... 74/473.16
4,759,417 A * 7/1988 Wanie et al. ............ 74/473.17
4,958,535 A * 9/1990 Swartzendruber ............ 74/481
5,062,510 A * 11/1991 Shimizu ...................... 74/481
5,233,880 A * 8/1993 Sato et al. ............... 74/473.16
5,992,262 A * 11/1999 Braine et al. ............ 74/473.16
6,250,414 B1 * 6/2001 Sato et al. .................. 180/307
6,354,388 B1 * 3/2002 Teal et al. ................... 180/6.2
6,484,827 B2 * 11/2002 Teal et al. ................... 180/6.2
6,722,464 B2 * 4/2004 Nakatani et al. ............ 180/305

FOREIGN PATENT DOCUMENTS

JP 2001-32926 2/2001

* cited by examiner

*Primary Examiner*—Hau Phan
(74) *Attorney, Agent, or Firm*—The Webb Law Firm

(57) ABSTRACT

A working vehicle provided with a hydraulic continuously variable transmission, has a plurality of wheels; a vehicle body supported by the plurality of wheels; a hydraulic continuously variable transmission that is supported by the vehicle body, and that has a speed change actuation shaft; a speed change pedal operatively linked to the speed change actuation shaft for controlling the speed change actuation shaft; and a neutral bias mechanism for biasing the speed change actuation shaft toward a neutral position. The bias mechanism includes a cam portion that pivots together with the speed change actuation shaft; an operation member that abuts against the cam portion; and a biasing means for biasing the operation member toward the cam portion. The biasing means is disposed above a step surface of a riding step.

15 Claims, 18 Drawing Sheets

7
23
237
248
27
2
10
54
12
11
1
6
3
4
17
5
15
9
8
18

7
23
54
237
248
27
10
12
11
9
15
5
17
4
3
6
2
18
8
1

27
46
54
23
26
7
21
21
166R
166L (A)

(B)

(A)

(B)

(C)

Lock Release
N
F
46
150
176
156
154
148
161b
149a
159
259
153
147
149b
168L
152
126
161a
151
161
145
172
s
174
164
5
162
a
163
167
c
166La
169L
17
130

5
247
252
251
226
269
245
246
P2
253
271
244
19
243
244a
249
250
259b
259A
259d
259B
259
259c
258c
258B
258A
265
225
P1
216B
258
262
258a
224
4b

WORKING VEHICLE WITH HYDRAULIC CONTINUOUSLY VARIABLE TRANSMISSION

BACKGROUND OF THE INVENTION

The present invention relates to working vehicles provided with a hydraulic continuously variable transmission.

As a configuration for changing the speed of working vehicles, an operation system for a hydraulic continuously variable transmission is provided in which, for example, a speed change actuation shaft of the hydraulic continuously variable transmission and a neutrality detecting means for detecting a neutral state of the speed change actuation shaft are arranged below a step surface of a riding step, an operation arm that pivots together with a speed change pedal is operatively linked, in a region below the step surface, via a link rod or other components, to a speed change arm fixedly attached to the speed change actuation shaft of the hydraulic continuously variable transmission, and a neutral bias mechanism for returning the speed change actuation shaft to a neutral position when the operation on the speed change pedal is released is disposed below the step surface (see JP 2001-32926A (paragraph Nos. 0024 to 0028 and 0033 to 0035, and FIGS. 1 to 4), for example).

However, the region below the step surface of the riding step is a crowded region in which, for example, an operation system for a braking device and hydraulic pipes for the hydraulic continuously variable transmission are arranged in addition to the operation system for the hydraulic continuously variable transmission, and is a region that is lower than the step surface and thus has a poor work efficiency, so that it is difficult to install the operation system of the hydraulic continuously variable transmission, the operation system of the braking device, or the hydraulic pipes of the hydraulic continuously variable transmission, for example, or to perform maintenance such as changing them or adjusting their positions.

Furthermore, mud or other substances are likely to adhere to the position below the step surface of the riding step.

SUMMARY OF THE INVENTION

It is an object of the present invention to improve the efficiency in installing or performing maintenance of, for example, biasing means of the neutral bias mechanism, and to effectively reduce problems caused by mud or other substances.

To this end, a working vehicle provided with a hydraulic continuously variable transmission in accordance with the present invention comprises a plurality of wheels; a vehicle body supported by the plurality of wheels; a hydraulic continuously variable transmission that is supported by the vehicle body, and that has a speed change actuation shaft; a speed change pedal operatively linked to the speed change actuation shaft for controlling the speed change actuation shaft; and a neutral bias mechanism for biasing the speed change actuation shaft toward a neutral position. The bias mechanism includes a cam portion that pivots together with the speed change actuation shaft; an operation member that abuts against the cam portion; and a biasing means for biasing the operation member toward the cam portion. The biasing means is disposed above a step surface of a riding step.

DETAILED DESCRIPTION OF PREFERRED EMBODIMENTS

Figure 1:
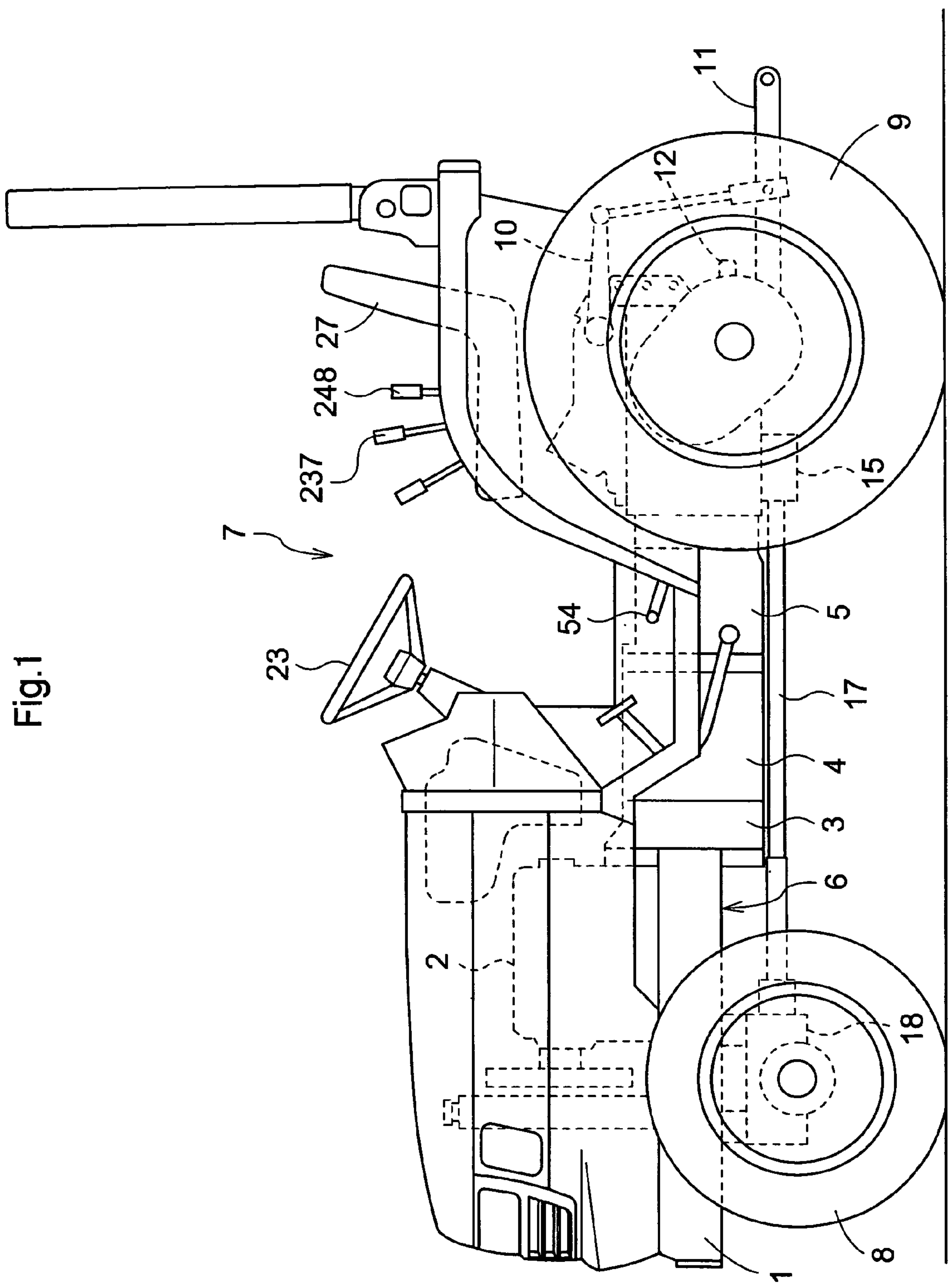
FIG. 1 is a general left lateral view of a tractor.
Figure 2:
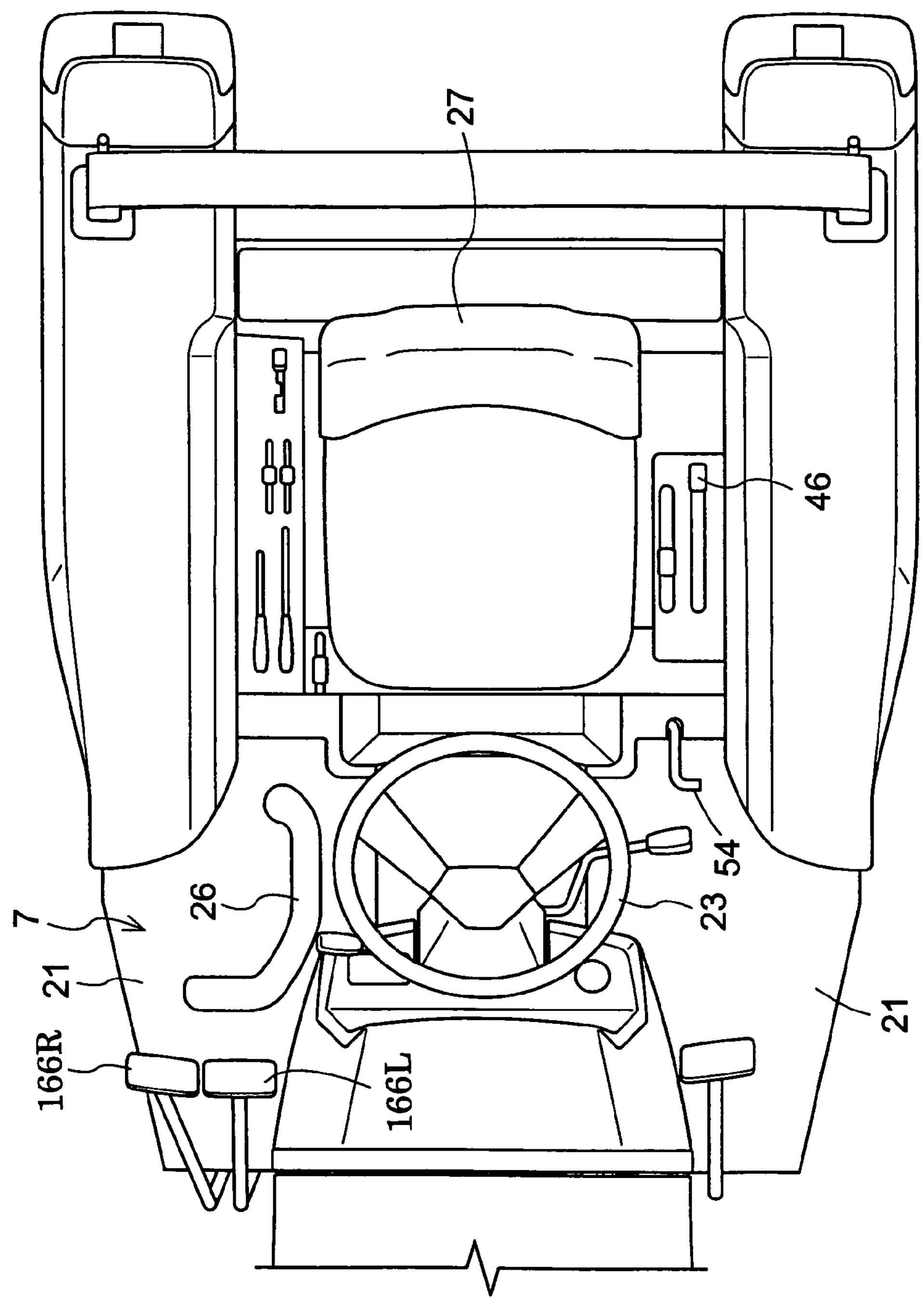
FIG. 2 is a plan view of the rear half portion of the tractor.

FIG. 1 shows a general lateral view of a tractor, which is an example of a working vehicle. In this tractor, a clutch housing 3 is connected to the rear end portion of an engine 2 mounted on and supported by a front frame 1. A hydrostatic continuously variable transmission (example of a hydraulic continuously variable transmission) 4, which is employed as a main transmission, is connected to the rear end portion of the clutch housing 3. A vehicle frame 6 is made by connecting a transmission case 5 to the rear end portion of the hydrostatic continuously variable transmission 4. A prime mover portion is formed in the front half portion of the vehicle frame 6. A operator's section 7 is formed in the rear half portion of the vehicle frame 6. A pair of left and right front wheels 8 for steering, which are configured such that motive power of the engine can be transmitted thereto, are arranged at the front lower portion of the vehicle frame 6. A pair of left and right rear wheels 9, which are configured such that motive power of the engine can be transmitted thereto, are arranged at the rear lower portion of the vehicle frame 6. A pair of left and right lift arms 10, a link mechanism 11, and other components, with which various types of operation devices (not shown) can be operatively attached, are attached to the rear end portion of the vehicle frame 6. A motive power take-off shaft 12, with which motive power of the engine can be taken off to, for example, the operatively attached operation devices, is disposed.

Figure 14:
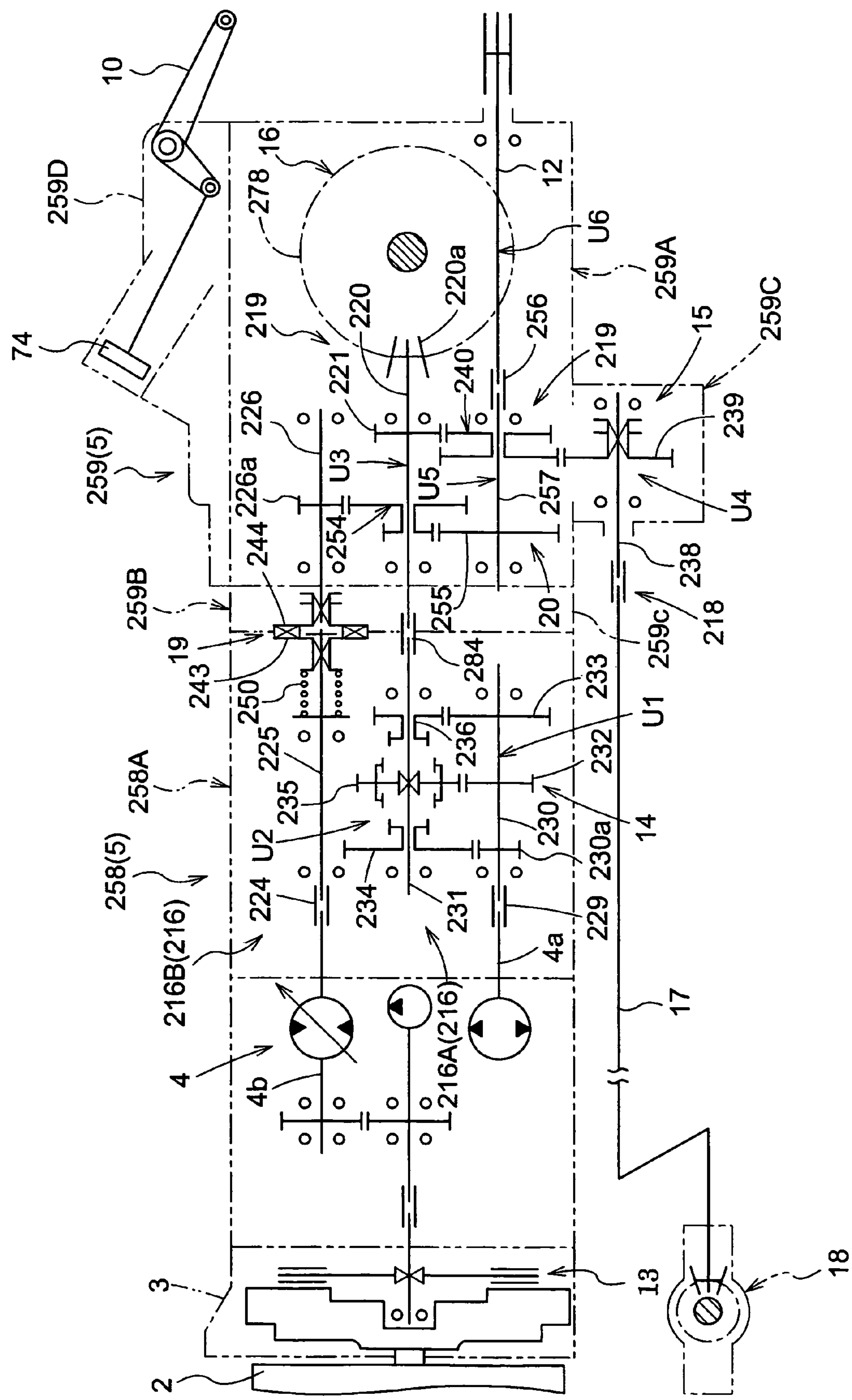
FIG. 14 is a schematic view showing the transmission configuration of the tractor.

As shown in FIG. 14, motive power from the engine 2 is transmitted to the hydrostatic continuously variable transmission 4 via a main clutch 13 in the form of a dry single plate included in the clutch housing 3. The motive power shifted by the hydrostatic continuously variable transmission 4, which is output from a motor shaft 4*a* of the hydrostatic continuously variable transmission 4, is transmitted as motive power for driving the vehicle from a geared transmission 14 employed as a sub transmission to a front wheel clutch 15 or a rear wheel differential 16 inside the transmission case 5. The motive power output from the front wheel clutch 15 is transmitted as motive power for driving the front wheels to the left and right front wheels 8 via, for example, a front wheel transmission shaft 17 and a front wheel differential 18. The motive power output from the rear wheel differential 16 is transmitted as motive power for driving the rear wheels to the left and right rear wheels 9. On the other hand, unshifted motive power output from a pump shaft 4*b* of the hydrostatic continuously variable transmission 4 is transmitted as motive power for operation to the motive power take-off shaft 12 via, for example, an operation clutch 19 and a speed reducer 20, which are included in the transmission case 5. The inner configuration of the transmission case 5 will be described later in detail with reference to FIGS. 15 to 18.

As shown in FIG. 1 for example, the operator's section 7 has, for example, riding steps 21 each defining a generally flat step upper surface and connected to the left and right portions of the vehicle frame 6, a steering wheel 23 supported by a steering post 22 disposed above the front of the hydrostatic continuously variable transmission 4, a pair of left and right brake pedals 166L and 166R arranged on the right side of the steering post 22, a parking lever 25 disposed behind the steering post 22, a speed change pedal 26 disposed on the right side on the vehicle frame 6, and a driver seat 27 disposed above the rear of the transmission case 5. The riding steps or simply steps are used often by the operator to get onto the driving area of the vehicle.

Figure 3:
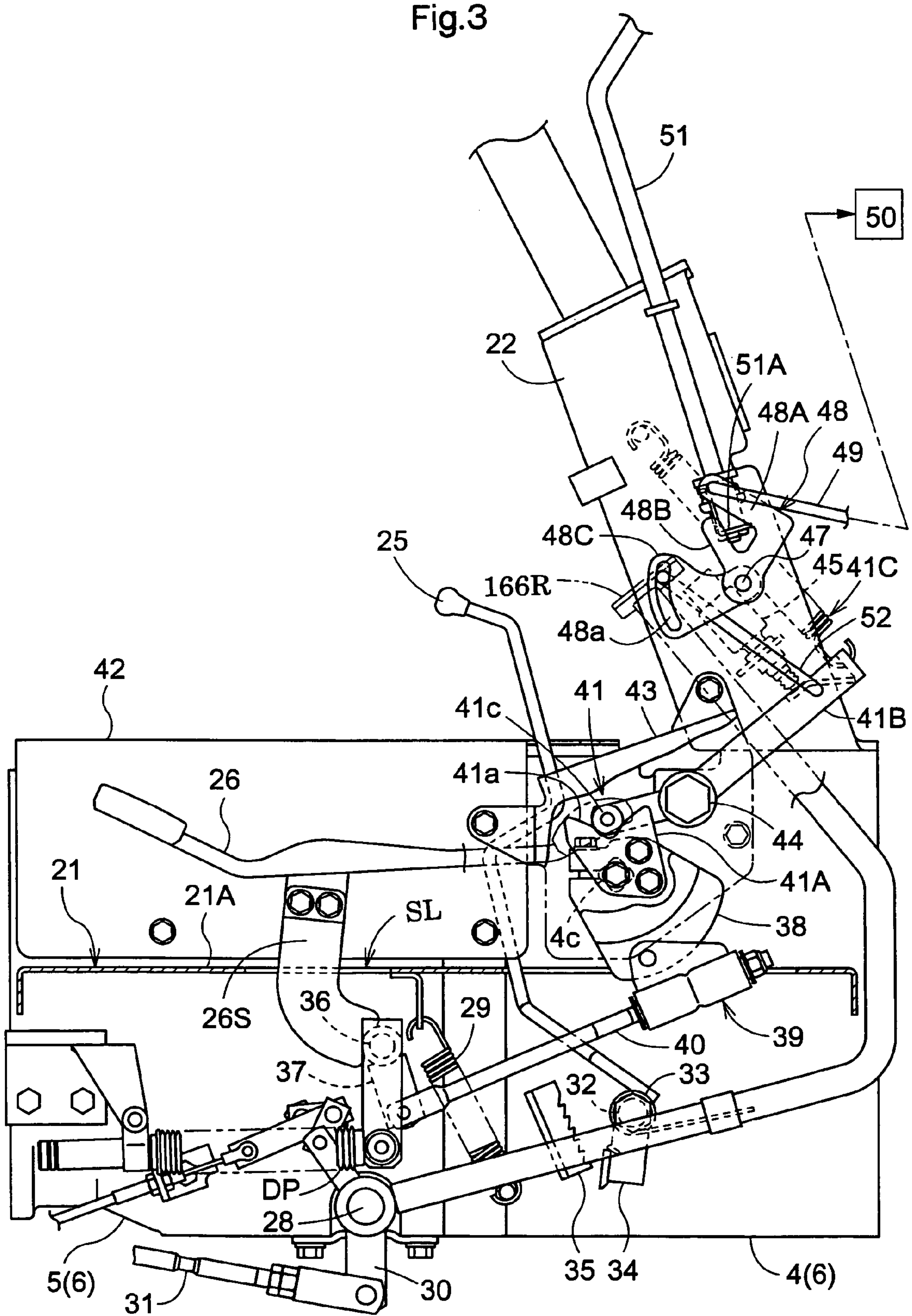
FIG. 3 is a right lateral view of a relevant part of a speed change operation system and a braking operation system.

As shown in FIG. 3, the left and right brake pedals 166L and 166R are supported such that they can pivot up and down about a support shaft 28 oriented in the lateral direction and attached to the transmission case 5 below the right riding step 21, and are biased by compression springs 29 disposed between the brake pedals 166L and 166R and the riding step 21 such that the brake pedals 166L and 166R return to upper non-braking positions. A swing arm 30 that swings together with each of the brake pedals 166L and 166R is linked, via a link rod 31 and other components, to a corresponding left or right side brake (not shown) such that the corresponding side brake operates with the operation amount in accordance with the pressed down amount when pressing down the corresponding brake pedal against the spring force of the compression spring 29.

The parking lever 25 is supported such that it can pivot back and forth about a support shaft 32 oriented in the lateral direction and attached to the hydrostatic continuously variable transmission 4 below the right riding step 21, and is biased by a torsion spring 33 fitted to the support shaft 32 such that the parking lever 25 returns to a rear non-braking position. In a state where both of the left and right brake pedals 166L and 166R are pressed down in the braking direction, when the parking lever 25 is pivoted forward against the spring force of the torsion spring 33, and a lock member 34 that pivots together with the parking lever 25 interlocks with a saw-shaped locked member 35 provided on each of the left and right brake pedals 166L and 166R, then a locked state is retained and a parking state is sustained in which the vehicle body is braked and stopped with both of the left and right side brakes.

As shown in FIG. 3 for example, the speed change pedal 26 has a pedal arm 26S passing through a slot SL extending in the fore-and-aft direction, and is supported, such that it can be pivoted in a balanced manner, about a support shaft 36 oriented in the lateral direction and attached to the transmission case 5 below the right riding step 21. An operation arm 37 that pivots together with the speed change pedal 26 is operatively connected to a speed change arm 38, which is fixedly attached to a trunnion shaft 4*c*, via a vibration prevention mechanism 39 pin-connected to a free end of the speed change arm 38, a link rod 40 disposed between the vibration prevention mechanism 39 and the operation arm 37, for example, such that the trunnion shaft 4*c*, serving as a speed change actuation shaft of the hydrostatic continuously variable transmission 4, changes the speed in conjunction with the operation of pressing down the speed change pedal 26.

The trunnion shaft 4*c* is disposed such that it is positioned above a step surface 21A of the right riding step 21. When the operation of pressing down the speed change pedal 26 is released, it is returned to the neutral position by the action of a neutral bias mechanism 41 and that state is retained. When the trunnion shaft 4*c* is in its neutral position, the shaft 4*c* and also the continuously variable transmission 4 are said to be in the neutral state.

The neutral bias mechanism 41 is constituted from, for example, a cam portion 41A made of a cam member bolted to the speed change arm 38, an operation member 41B for pressing against the cam portion 41A, and a compression spring 41C serving as a biasing means for pressing the operation member 41B toward the cam portion 41A, and is protected by a removable protection cover 43 that is disposed between the steering post 22 and a frame cover 42 for covering the upper portion of the vehicle frame 6 positioned between the left and right riding steps 21.

A substantially V-shaped cam concave portion 41*a* pressed against and actuated by the operation member 41B is formed on the upper side of the cam portion 41A. Furthermore, connection holes 41*b* with which the cam portion 41A is attached to the speed change arm 38 are formed in the shape of an arc about the trunnion shaft 4*c*, and thus the position at which the cam portion 41A supported by the trunnion shaft 4*c* is connected to the speed change arm 38 can be changed within a tolerance range of the connection holes 41*b*.

The operation member 41B is supported, such that it can be pivoted in a balanced manner, about a stepped bolt 44 oriented in the lateral direction and screwed in the upper portion of the hydrostatic continuously variable transmission 4, above the right riding step 21. A roller 41*c* that acts on the cam concave portion 41*a* of the cam portion 41A with the spring force of the compression spring 41C so as to press against the cam portion 41A is attached to one end of the operation member 41B, the other end thereof being curved inward into the steering post 22, and a detection arm 41*d* for detecting a return to a neutral position is attached to the other end. The detection arm 41*d* presses operatively against a plunger switch 45 serving as a neutrality detection means, disposed inside the steering post 22, when the trunnion shaft 4*c* returns to a neutral position.

The compression spring 41C is disposed between the steering post 22 and the other end portion of the operation member 41B extending into the steering post 22, so that the compression spring 41C is positioned inside the steering post 22 together with the plunger switch 45.

Herein, the plunger switch 45 is one of components in an engine start diversion circuit (not shown), and is used for preventing a sudden acceleration of the vehicle body, which is caused when the engine 2 is started in a state in which the trunnion shaft 4*c* has not been returned to the neutral position.

Figure 5:
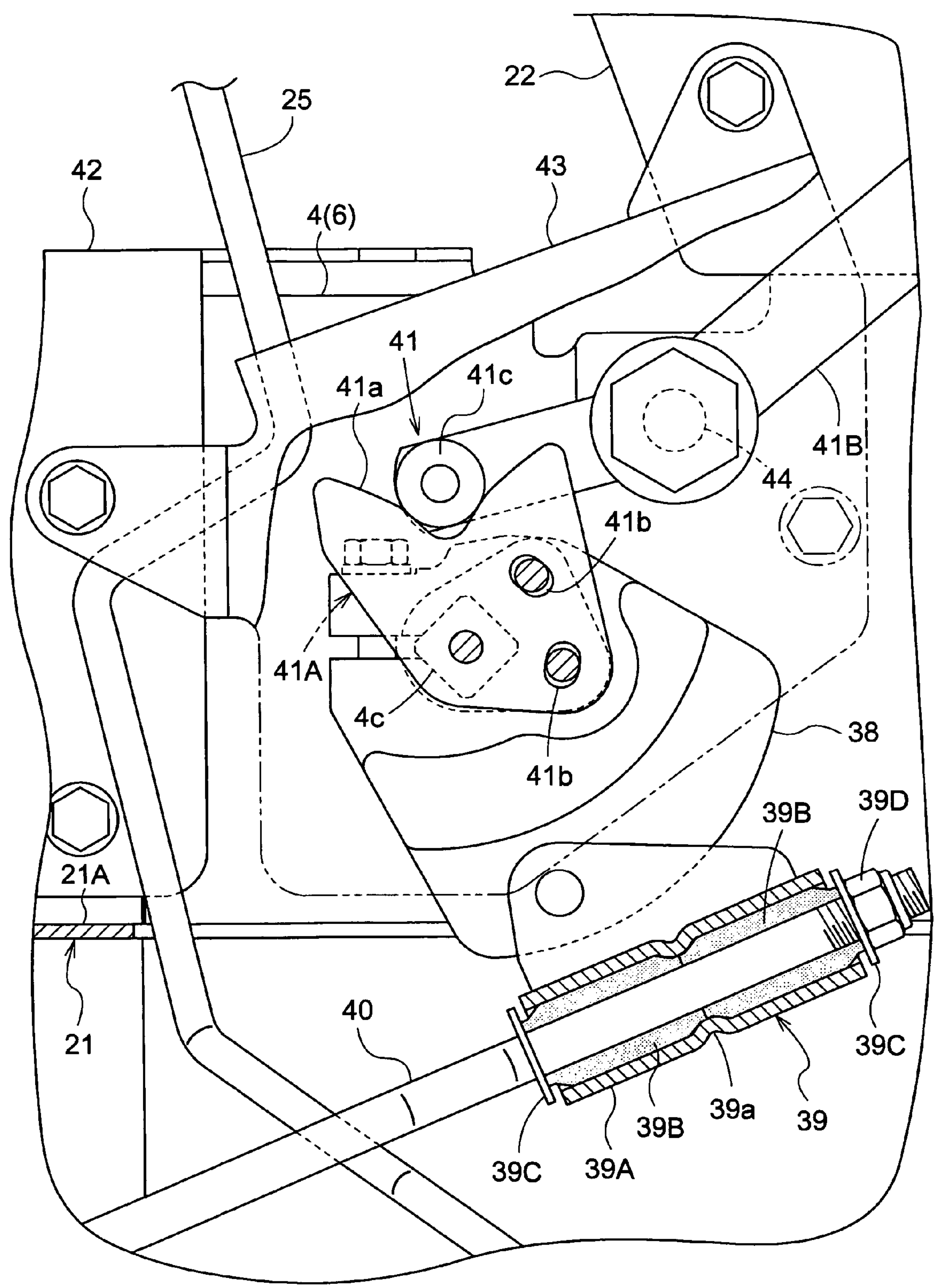
FIG. 5 is a right lateral view of a relevant part of the configuration of a neutral bias mechanism.
Figure 6:
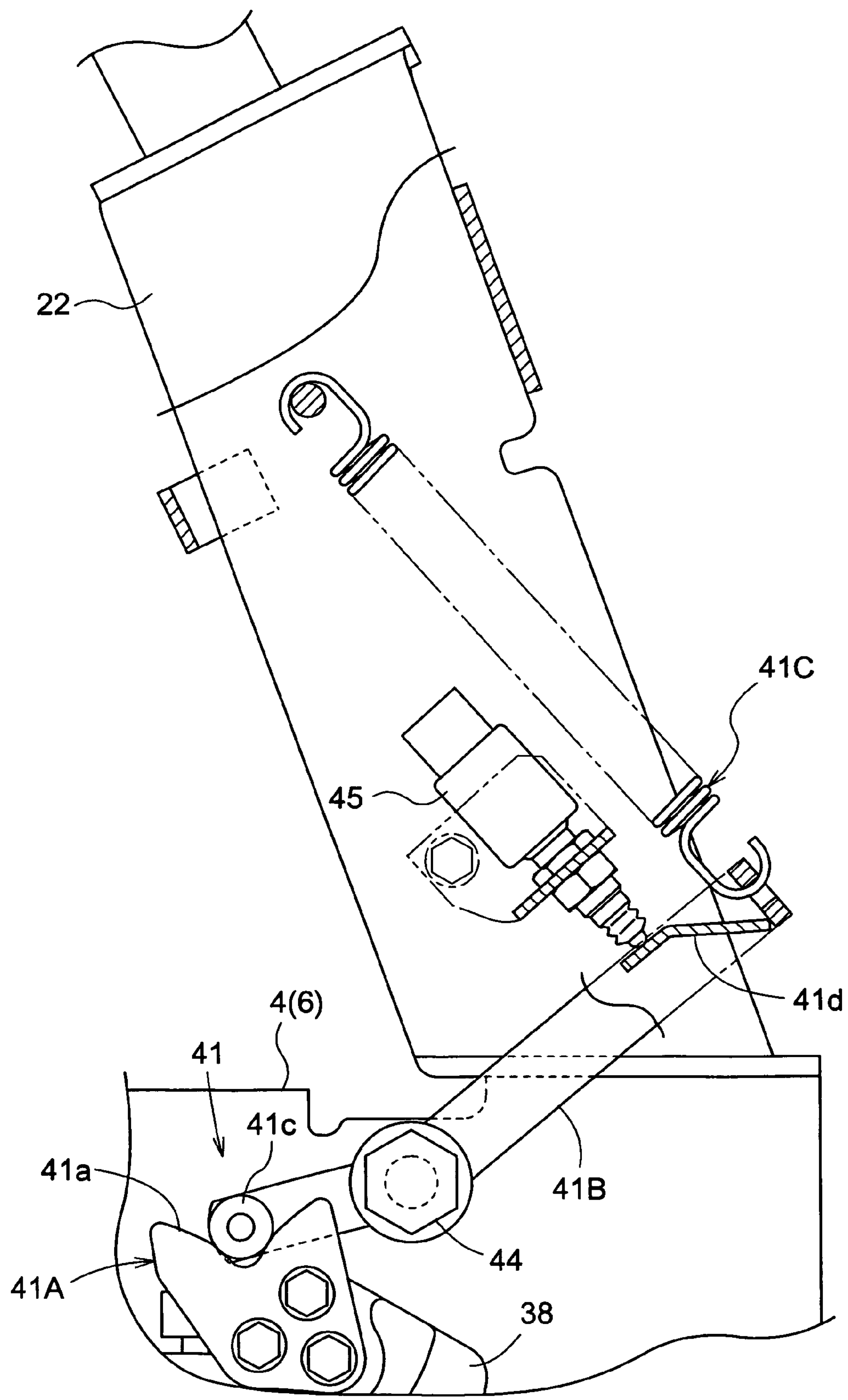
FIG. 6 is a vertical sectional right lateral view of a relevant part of an arrangement of a biasing means and a neutrality detecting means of the neutral bias mechanism.

As shown in FIG. 5, a pair of tubular vibration prevention rubber pieces 39B are placed between a holder 39A pin-connected to the speed change arm 38 such that it can pivot relatively to it, and the link rod 40 passing through the holder 39A such that the jointed end portions of the vibration prevention rubber pieces 39B are borne and supported by a constricted portion 39*a* formed at the middle of the holder 39A. A pair of washers 39C for receiving the end portions of the vibration prevention rubber pieces 39B exposed from the holder 39A are fitted to and attached to the link rod 40 and then fastened with a nut 39D screwed to the link rod 40 on the side of vibration prevention mechanism 39. Thus, the vibration prevention mechanism 39 is constituted in a simple manner with a smaller number of components, between the speed change arm 38 and the link rod 40. Vibrations generated, for example, when operation oil surges in the hydrostatic continuously variable transmission 4 are absorbed by the pair of vibration prevention rubber pieces 39B arranged between the constriction portion 39*a* of the holder 39A and the pair of washers 39C, and abnormal noise or a swinging of the speed change pedal 26 via the link rod 40, due to the vibration, is prevented.

The speed change arm 38 is configured with a weight for preventing a vibration in the hydrostatic continuously variable transmission 4, and thus the number of components or assembly steps is reduced, and abnormal noise or a swinging of the speed change pedal 26 due to vibrations in the hydrostatic continuously variable transmission 4 is effectively prevented, compared with a case in which a weight for preventing vibrations is separately disposed.

The neutral bias mechanism 41 is constituted, as described above, from the cam portion 41A supported by the trunnion shaft 4*c* and attached to the speed change arm 38 in a displaceable manner, the operation portion 41B for pressing against the cam portion 41A, and the compression spring 41C for resiliently pressing the operation member 41B against the cam portion 41A, for example. This neutral bias mechanism 41 is disposed above the step surface 21A of the right riding step 21 together with, for example, the trunnion shaft 4*c* of the hydrostatic continuously variable transmission 4, the speed change arm 38 fixedly attached to the trunnion shaft 4*c*, and the plunger switch 45 for detecting that the trunnion shaft 4*c* has returned to the neutral position. Among these, the compression spring 41C, the detection arm 41*d*, and the plunger switch 45, for example, are arranged inside the steering post 22 provided above the front of the hydrostatic continuously variable transmission 4. The trunnion shaft 4*c* of the hydrostatic continuously variable transmission 4, the speed change arm 38, the cam portion 41A, and the roller 41*c* and the supporting point portion of the operation member 41B, for example, are covered and protected by the removable protection cover 43 or other components from the outside. Thus, it is possible to install them, to perform neutrality adjustment on the neutral bias mechanism 41 with respect to a neutral position of the trunnion shaft 4*c*, performed by adjusting the position of the cam potion 41A supported by the trunnion shaft 4*c* with respect to the speed change arm 38, or to perform maintenance such as changing the compression spring 41C or the plunger switch 45, from above the riding step 21, without requiring an unnatural posture, contrary to a case in which they are arranged in the region below the step surface 21A of the riding step 21.

In particular, the neutrality adjustment of the neutral bias mechanism 41 with respect to a neutral position of the trunnion shaft 4*c* is performed by adjusting the position of the cam portion 41A supported by the trunnion shaft 4*c* with respect to the speed change arm 38, and thus an eccentric cam is not required and the neutrality adjustment can be performed easily, contrary to a case in which, for example, a position adjustment mechanism comprising an eccentric cam and other components is disposed at the supporting point of the operation member 41B, and the position at which the operation member 41B presses against the cam portion 41A (the position of the roller 41*c*) is changed, so that the neutrality adjustment of the neutral bias mechanism 41 with respect to a neutral position of the trunnion shaft 4*c* is performed.

Furthermore, when they are arranged above the step surface 21A of the riding step 21, the compression spring 41C, the detection arm 41*d* and the plunger switch 45, for example, are arranged effectively using the inner space of the steering post 22 in which substantially no other component than a steering operation system is disposed. Thus, it is possible to prevent the risk that the arrangement of the compression spring 41C, the detection arm 41*d* and the plunger switch 45, for example, degrades the installation efficiency of the other components.

Furthermore, it is possible to ease the crowded state of other components in the region below the step surface 21A of the riding step 21. Accordingly, the left and right brake pedals 166L and 166R, the compression springs 29, the swing arm 30 and the link rod 31, which serve as operation systems for the left and right side brakes, the parking lever 25 and the torsion spring 33, which use the left and right side brakes as the parking brakes, the speed change pedal 26, the operation arm 37, the vibration prevention mechanism 39 and the link rod 40, which serve as the operation system of the hydrostatic continuously variable transmission 4, for example, can be easily installed and maintenance such as adjusting their positions can be easily performed, in the region below the step surface 21A of the riding step 21.

In addition, mud or other substances are effectively prevented from adhering to the neutral bias mechanism 41 or the plunger switch 45, and thus the trouble occurs less that the trunnion shaft 4*c* does not to return to the neutral position because mud or other substances adhere to, for example, the cam portion 41A or the compression spring 41C of the neutral bias mechanism 41, or that the plunger switch 45 cannot detect the neutral state of the trunnion shaft 4*c* because mud or other substances adhere to, for example, the plunger switch 45, resulting in that the engine 2 cannot be started based on the neutrality detection.

Herein, the symbol DP in FIG. 3 denotes a damper installed for the purpose of preventing the trunnion shaft 4*c* of the hydrostatic continuously variable transmission 4 from suddenly returning to the neutral position by the action of the neutral bias mechanism 41 when an operation of pressing down the speed change pedal 26 is released.

Figure 4:
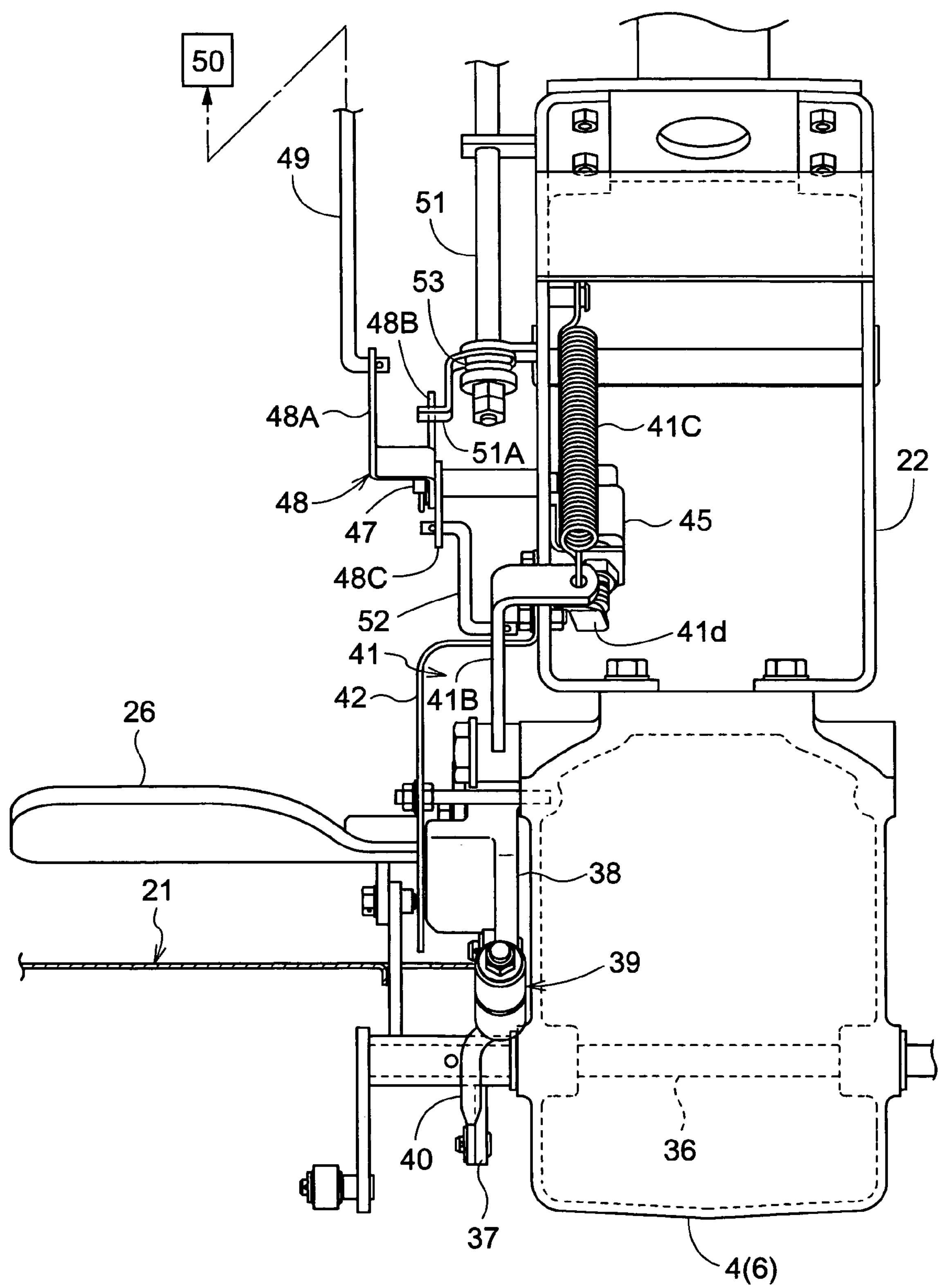
FIG. 4 is a vertical sectional front view of a relevant part of the speed change operation system and the braking operation system.

As shown in FIGS. 3 and 4, a support shaft 47 oriented in the lateral direction and extending toward the right outside is attached to the right side of the steering post 22, and a substantially E-shaped intermediate arm 48 is supported by the support shaft 47 in a relatively pivotable manner. As for the intermediate arm 48, a first link portion 48A of its upper portion is operatively connected, via an accelerator rod 49, to a speed regulator 50 of the engine 2, a second link portion 48B of its center portion in the vertical direction abuts against and is linked to a link portion 51A of an accelerator lever 51 disposed on the right side of the steering post 22, and a third link portion 48C of its lower portion is provided with an elongated hole 48*a* in the form of an arc around the support shaft 47, and a free end of a link rod 52 whose one end portion is linked to the other end of the operation member 41B positioned below the elongated hole 48*a* passes through and is linked to the elongated hole 48*a*. A friction-based retention mechanism 53 for retaining the accelerator lever 51 at any operation state is attached to the accelerator lever 51.

With this configuration, the accelerator lever 51 can be operated to set and retain the minimum rotation number of the engine 2 to any rotation number. In the operation of pressing down the speed change pedal 26 in this retention state, when the free end of the link rod 52 is within a tolerance range of the elongated hole 48*a*, the engine rotation number is retained at the minimum rotation number set with the accelerator lever 51, and when the free end portion of the link rod 52 is out of the tolerance range of the elongated hole 48*a*, the free end portion of the link rod 52 presses the lower edge portion of the elongated hole 48*a* to pivot the intermediate arm 48 to the side on which the engine rotation number is increased, and thus the engine rotation number is increased in conjunction with the speed increasing operation by the operation of pressing down the speed change pedal 26. Subsequently, when the operation of pressing down the speed change pedal 26 is released, the speed change pedal 26 pivots back to the neutral position, but the second link portion 48B of the intermediate arm 48 swings and stops at a position abutting against the link portion 51A of the accelerator lever 51, and thus the engine rotation number is retained at the minimum rotation number set by the accelerator lever 51.

In other words, for example, during an operation with a trailer in which an article pallet (not shown) is linked to the rear end of the tractor, it is possible to increase the engine rotation number in conjunction with the speed increasing operation by the operation of pressing down the speed change pedal 26, by setting and retaining the accelerator lever 51 at an idling position, and it is possible to automatically return the engine rotation number to that in the idling state in accordance with an appearance of the neutral state of the hydrostatic continuously variable transmission 4 obtained by releasing the operation of pressing down the speed change pedal 26 when the tractor is temporarily stopped, for example, at a traffic light. With this configuration, it is possible to prevent a poor comfortability, caused by a significant vibration and noise of the vehicle body, because the engine rotation number is retained at a high number even in a temporary stop, for example, at a traffic light, when the accelerator lever 51 is set to be retained at a high rotation position during, for example, an operation with a trailer.

Furthermore, for example, during an operation with a front loader in which a front loader (not shown) is linked to the front end of the tractor, at the time of running the bucket of the front loader into, for example, piled soil, it is possible to increase the engine rotation number even during a low speed state, by setting and retaining the accelerator 51 at an operation position at which the minimum rotation number of the engine 2 is increased, and it is also possible to easily increase the engine rotation number to the maximum rotation number in conjunction with the speed increasing operation by the operation of pressing down the speed change pedal 26. Further, it is possible to prevent an unexpected engine stop caused by the sudden load at that time.

Figure 7:
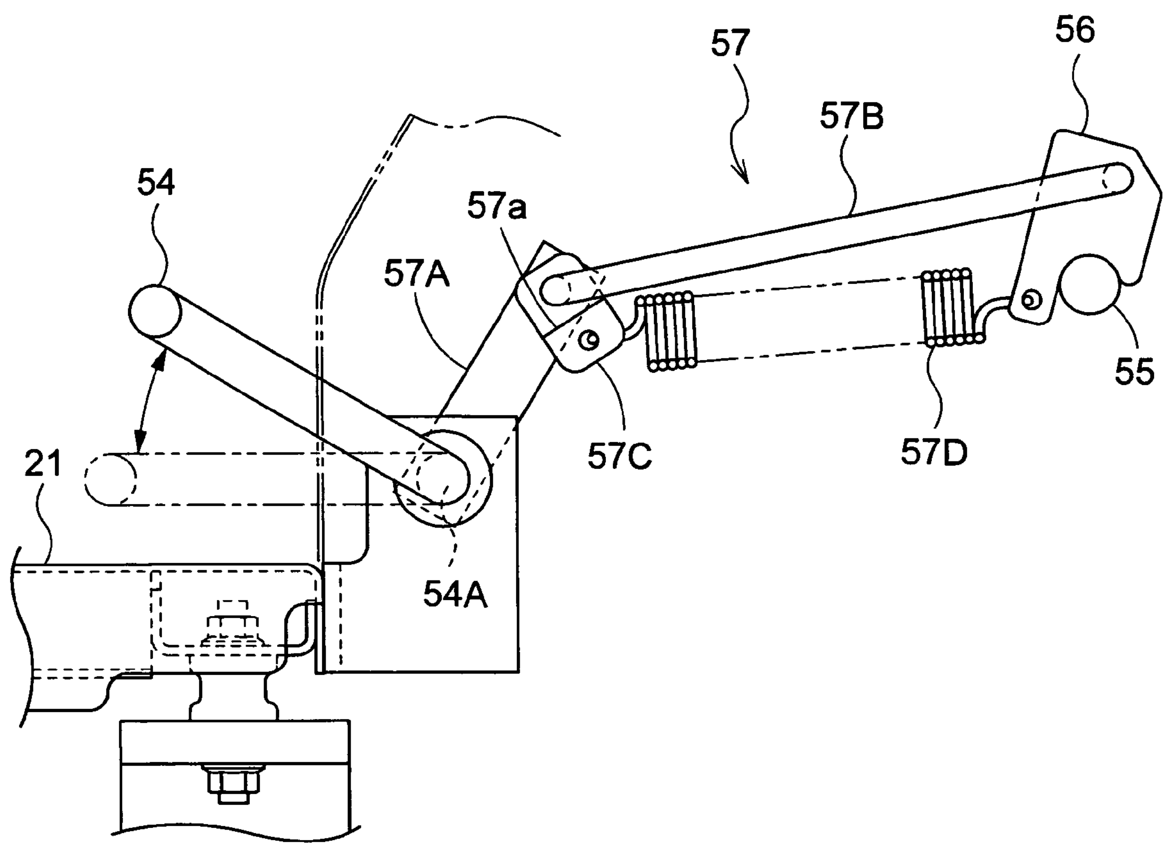
FIG. 7 is a left lateral view of a relevant part of a differential locking operation system.
Figure 8:
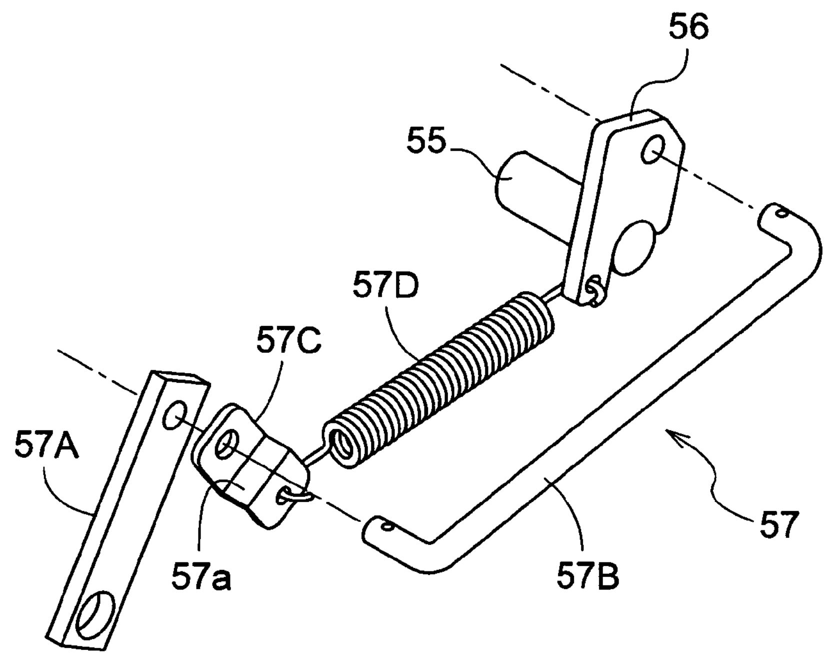
FIG. 8 is an exploded perspective view of a link mechanism in the differential locking operation system.
Figure 8:
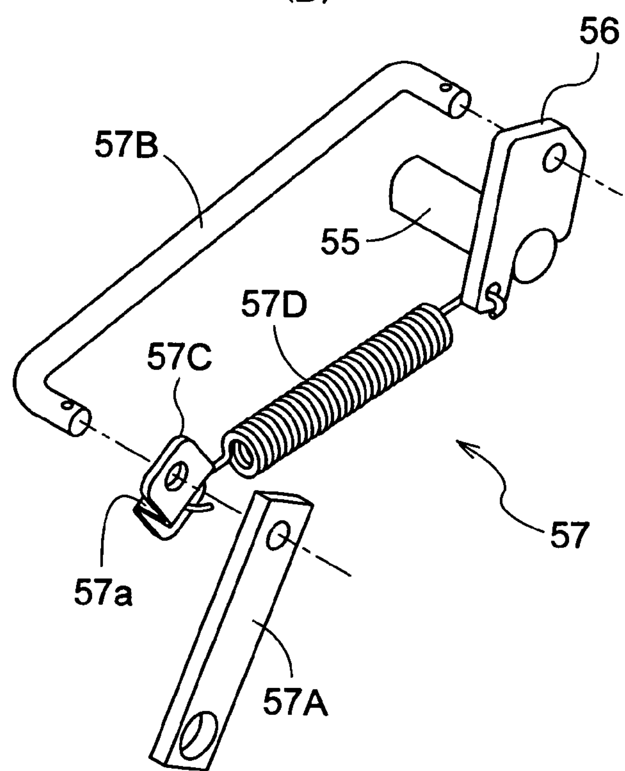

As shown in FIGS. 1 and 7, a differential locking pedal 54 for activating a differential locking device (not shown) that prevents differential transmission to the left and right rear wheels 9 by the action of the rear wheel differential 16, as it is pressed down, is disposed above the rear of the left riding step 21 in the operator's section 7.

The differential locking pedal 54 is made by bending a round bar member. A support shaft portion 54A, serving as the pivot point, is linked via a link mechanism 57 to an operation arm 56 fixedly attached to an operation shaft 55 of the differential locking device projecting outward from the left side of the transmission case 5.

As shown in FIG. 7 for example, the link mechanism 57 is constituted from, for example, a swing arm 57A operatively attached to the support shaft portion 54A of the differential locking pedal 54 such that it swings together with the differential locking pedal 54, a substantially U-shaped link rod 57B disposed between a free end of the swing arm 57A and one end portion of the operation arm 56, a link arm 57C through which one end portion of the link rod 57B passing through the free end portion of the swing arm 57A passes, and a compression spring 57D disposed between the link arm 57C and the other end portion of the operation arm 56.

The link arm 57C is bent and has an abutting portion 57*a* abutted against the link rod 57B by the spring force of the compression spring 57D, between one end portion through which the link rod 57B passes and the other end locked on the compression spring 57D.

With the above-described link configuration, the differential locking pedal 54 and the differential locking device are returned to and retained at a differential locking position or a differential lock releasing position with the spring force of the compression spring 57D, and it is possible to switch the differential locking device from the differential lock releasing state to the differential locking state based on the operation of pressing down the differential locking pedal 54 from the differential lock releasing position to the differential locking position against the spring force of the compression spring 57D.

With the thus configured link mechanism 57, in the tractor configured such that with the hydrostatic continuously variable transmission 4 employed as the main transmission, it is necessary to dispose the speed change pedal 26 on the right side of the operator's section 7, and the differential locking pedal 54 is disposed on the left side of the operator's section 7, it is easy to link, via the link mechanism 57, the differential locking pedal 54 disposed on the left side of the operator's section 7 and the operation arm 56 fixedly attached to the operation shaft 55 of the differential locking device projecting outward from the left side of the transmission case 5, by installing them from the left outside of the vehicle body. Furthermore, in a tractor configured such that with a geared transmission (not shown) employed as a main transmission, it is not necessary to dispose the speed change pedal 26 on the right side of the operator's section 7, and the differential locking pedal 54 can be disposed on the right side of the operator's section 7, it is easy to link, via the link mechanism 57, the differential locking pedal 54 disposed on the right side of the operator's section 7 and the operation arm 56 fixedly attached to the operation shaft 55 of the differential locking device projecting outward from the right side portion of the transmission case 5, by installing them from the right outside of the vehicle body.

In other words, when the link mechanism 57 is thus configured, in either vehicle body configuration in which the differential locking pedal 54 and the operation arm 56 of the differential locking device are disposed on the left side of the vehicle body or in which in the differential locking pedal 54 and the operation arm 56 of the differential locking device are disposed on the right side of the vehicle body, it is easy to link, employing the same configuration as the link mechanism 57, between the differential locking pedal 54 and the differential locking device in the operation from the outside of the vehicle body, so that it is possible to improve the installation efficiency while achieving a cost reduction and simple management of the components due to the shared use of the components.

Next, the configuration relating to a speed lock mechanism 145 is described with reference to FIGS. 10 to 12.

Figure 10:
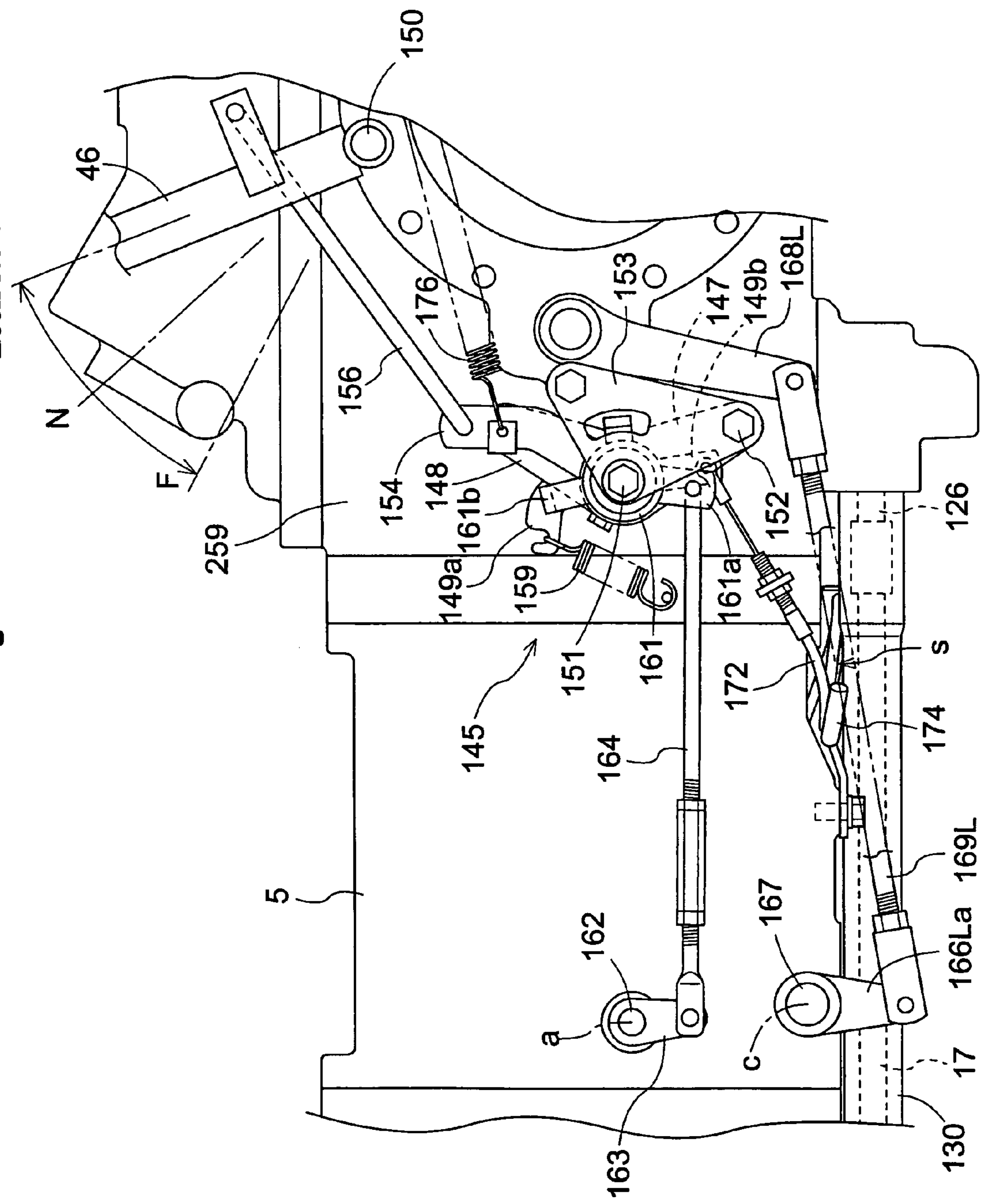
FIG. 10 is a lateral view of a speed lock mechanism.
Figure 11:
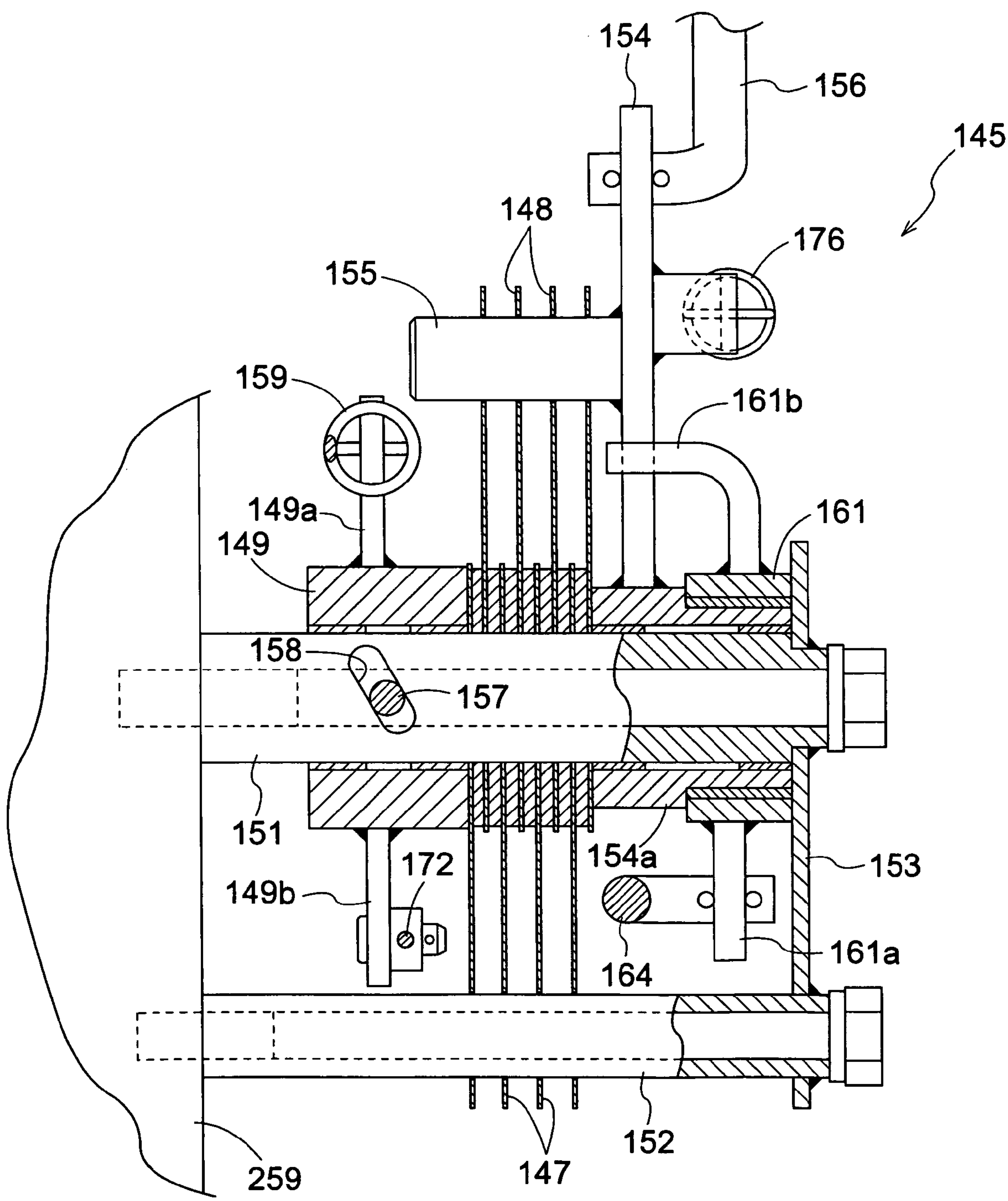
FIG. 11 is a vertical sectional front view of the speed lock mechanism.

The speed lock mechanism 145 for retaining the hydrostatic continuously variable transmission 4 at any speed position only within the forward range is attached on the left side face of a downstream side case portion 259 (also referred to as "differential housing") of the transmission case 5, and its detailed configuration is shown in FIGS. 10 and 11. The speed lock mechanism 145 is provided with, for example, a speed setting lever 46 operatively connected to the hydrostatic continuously variable transmission 4, a plurality of fixed friction plates 147 and movable friction plates 148 arranged alternately in parallel, and a shift member 149 for pressing against or releasing the group of the friction plates 147 and 148.

Support shafts 150, 151, and 152 are operatively attached in parallel to the left side face of the downstream side case portion 259, and the speed setting lever 46 is loosely fitted to the support shaft 150 such that it can freely rotate. The fixed frication plates 147 are inserted into the support shafts 151 and 152 such that they can slide only in the axis direction, and the movable friction plates 148 are inserted into the support shaft 151 such that they can freely rotate about the axes and can slide in the axis direction. A rotation arm 154 whose position is fixed in the axis direction by an end plate 153 is loosely fitted to the support shaft 151, an engagement pin 155 projecting from the rotation arm 154 passes through and is locked on the group of the friction plates 148, and the rotation arm 154 is operatively connected to the speed setting lever 46 via a rod 156.

A pair of pins 157 are screwed to diagonal positions of the shift member 149, and their inner ends are engaged with an inclined cam groove 158 formed on the support shaft 151. When the shift member 149 rotates forward or in reverse, the shift member 149 is shifted forward or in reverse in the axis direction by the action of the cam between the pins 157 and the inclined cam groove 158. Furthermore, the shift member 149 is biased to rotate forward (anticlockwise in FIG. 10) by a spring 159 extended between an arm 149*a* projecting from the shift member 149 and a fixed portion on the vehicle body, and thus the shift member 149 is biased to be shifted to the side of the friction plates by the above-described action of the cam due to this rotational spring force, so that the fixed friction plates 147 and the movable friction plates 148 are overlapped and pressed against each other.

Accordingly, when pivoting the speed setting lever 46 back and forth, the rotation arm 154 is rotated in conjunction with this, so that the movable friction plates 148 are rotated with respect to the fixed friction plates 147, and when stopping the speed setting lever 46, the movable friction plates 148 are fixed on the fixed friction plates 147 due to the frictional force, so that the speed setting lever 46 is fixed and retained at that position.

A boss 161 provided with a link arm 161*a* and an abutting arm 161*b* is loosely fitted to a boss portion 154*a* of the rotation arm 154. A support shaft 162 connected to the speed change pedal 26 passes through the left side face of the transmission case 5. An interlock arm 163 connected to the projected end is operatively connected, via a rod 164, to the link arm 161*a*. The abutting arm 161*b* is configured such that its free end portion is bent to abut against and engage with the rotation arm 154 from the front. Thus, with the operation of pressing down the speed change pedal 26 forward or in reverse, the rod 164 is pushed or pulled in conjunction with the operation, and thus the link arm 161*a* is rotated forward or in reverse and the abutting arm 161*b* is rotated forward or in reverse in one piece therewith.

The speed lock mechanism 145 is configured as described above, and its operation is described next.

When advancing while changing the speed using the speed change pedal 26, the speed setting lever 46 is operated to be the lock releasing position, which is the rearmost position. In this state, the rotation arm 154 is withdrawn to the position shifted backward from the range in which the abutting arm 161*b* rotates, and even with the operation of pressing down the speed change pedal 26 forward or in reverse for forward travel and reverse, the abutting arm 161*b* is freely rotated without interference by the rotation arm 154 in conjunction with this operation.

When advancing with a fixed speed, the speed setting lever 46 is operated to be in front of the neutral position. Accordingly, the rotation arm 154 is rotated forward exceeding the neutral position of the abutting arm 161*b*, and thus the abutting arm 161*b* is rotated forward because of the abutting, the rod 164 is pulled backward, and the speed change pedal 26 is rotated in the forward direction. Herein, the frictional force between the fixed friction plates 147 and the movable friction plates 148 in the speed lock mechanism 145 is set to be greater than a neutrality recover force acting on the speed change pedal 26, and thus the speed change pedal 26 is retained at any forward speed change position selected with the speed setting lever 46.

As described above, when simultaneously pressing down the left and right brake pedals 166L and 166R arranged side by side to perform a braking operation while advancing with a fixed speed, the speed lock mechanism 145 is configured such that the lock is automatically released. Hereinafter, the configuration to achieve this is described.

Each of the left and right brake pedals 166L and 166R is supported at a supporting point c on the right side of the transmission case 5 such that it can pivot independently of the other. The base portions of the two brake pedals 166L and 166R are fitted side by side to a right projecting portion of a support shaft 167 arranged so as to pass through the lower portion of the transmission case 5 in the lateral direction. The base portion of the right brake pedal 166R is loosely fitted to the support shaft 167, and the base portion of the left brake pedal 166L is connected to and fixed on the support shaft 167. A pedal arm 166Ra extending from the base portion of the right brake pedal 166R is operatively connected, via a rod 169R, to a side brake operation arm 168R for braking the right rear wheel attached on the right side of the downstream side case portion 259, and a pedal arm 166La connected to the left passing though end of the support shaft 167 is operatively connected, via a rod 169L, to a side brake operation arm 168L for braking the left rear wheel attached on the left side of the downstream side case portion 259. Thus, when pressing down the left and right brake pedals 166L and 166R in different manners, one of the rear wheels 9 is braked, so that the vehicle can have a small turning circle, and when simultaneously pressing down the left and right brake pedals 166L and 166R, the left and right rear wheels 9 are braked at the same time, so that the vehicle can be stopped.

Figure 9:
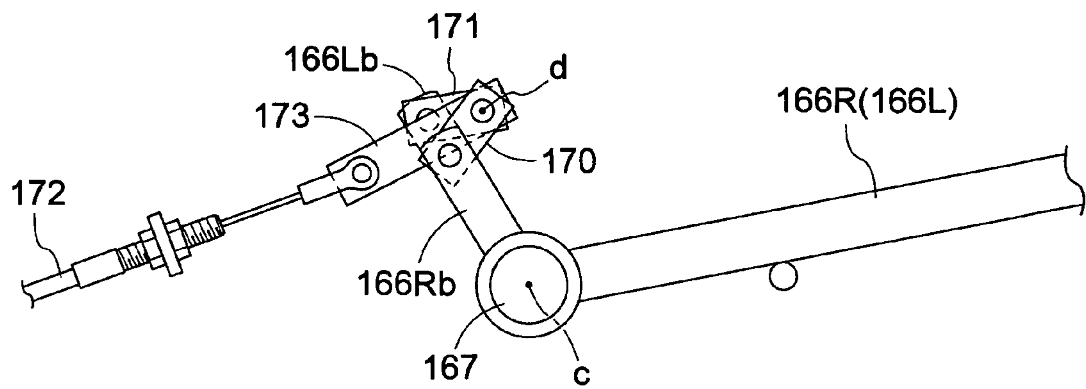
FIG. 9 is a lateral view of a braking operation portion.
Figure 9:
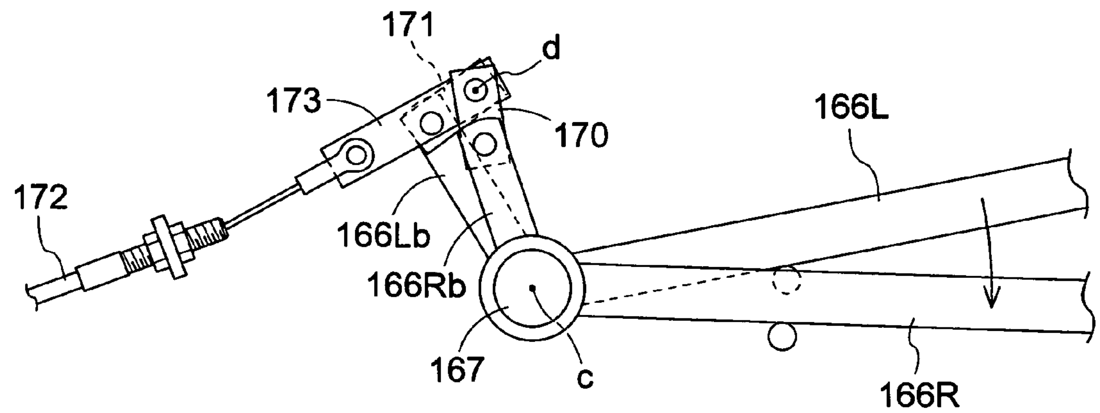
Figure 9:
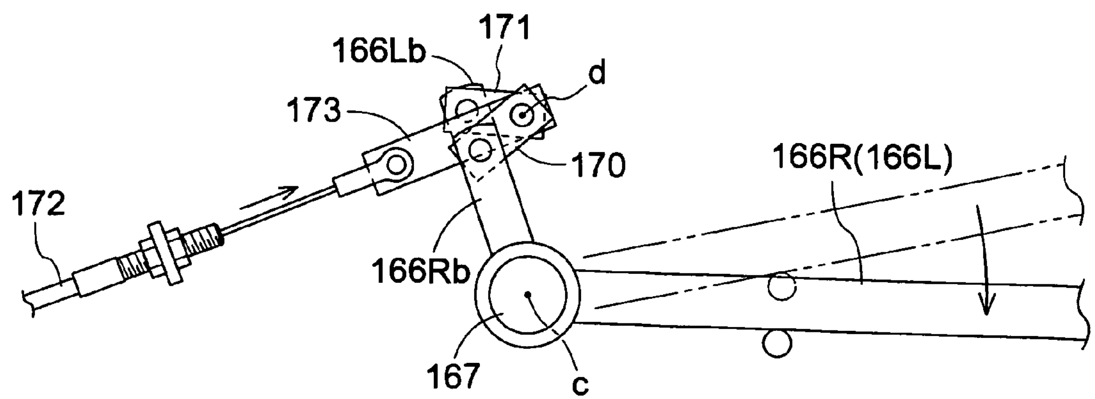

As shown in FIG. 9, arms 166Lb and 166Rb having mutually different lengths project upward from the base portions of the left and right brake pedals 166L and 166R. Bending and stretching links 170 and 171 are pivotally connected between free ends of the arms 166Lb and 166Rb. An inner front end of an operation wire 172, serving as a link member for releasing the lock, is connected to a bending and stretching connection point d of the bending and stretching links 170 and 171, via a connection link 173.

With the above-described configuration, as shown in FIG. 9B, in a state in which either one of the left and right brake pedals 166L and 166R is pressed down, the bending and stretching links 170 and 171 are bent or stretched, but the bending and stretching connection point d does not substantially move forward or backward, and thus the inner front end of the operation wire 172 is not pulled. Furthermore, as shown in FIG. 9C, in a state in which the left and right brake pedals 166L and 166R are pressed down at the same time, the bending and stretching links 170 and 171 are shifted forward without changing their bent or stretched orientation, and thus the inner front end of operation wire 172 is pulled forward.

As shown in FIG. 10, below the vehicle body, the operation wire 172 is configured so as to pass through a space s between the vehicle body and a cylindrical cover 130 fixed on the vehicle body such that it covers the transmission shaft 17 for driving the front wheels, extending from the left side of the vehicle body. At the extending end, the inner rear end is connected to an operation arm 149*b* extending downward from the shift member 149. Herein, the operation wire 172 below of the vehicle body is borne and supported from below by a wire bearing member 174 attached to the lower side of the transmission case 5.

Figure 12:
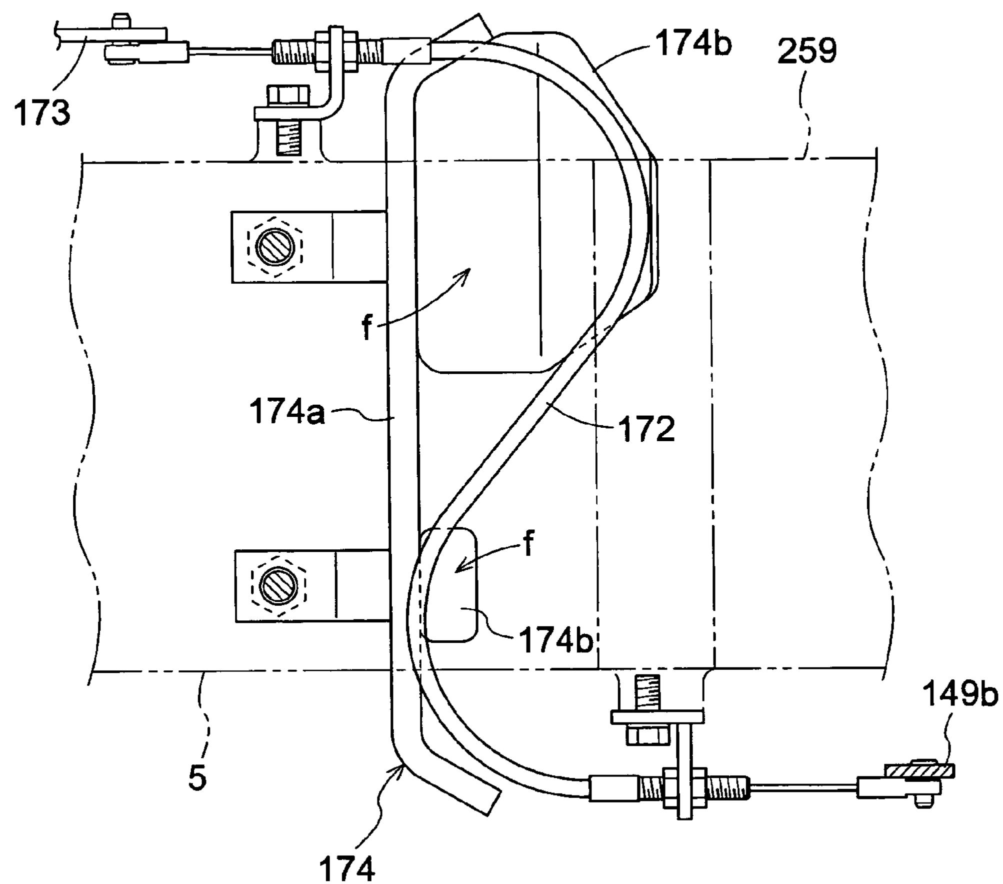
FIG. 12 is a plan view showing how an operation wire for releasing the speed lock is disposed.
Figure 13:
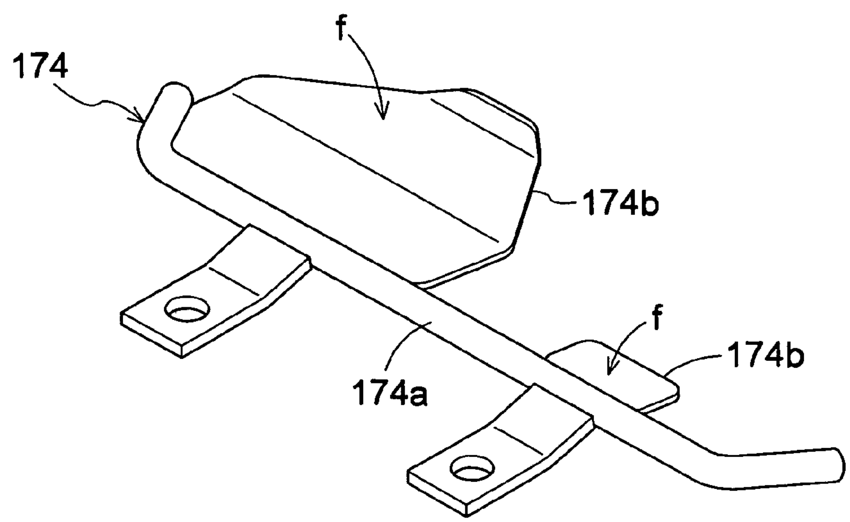
FIG. 13 is a perspective view of a wire bearing member.

As shown in FIGS. 12 and 13, the operation wire 172 is bent into an S-shape when viewed from the above such that its front and rear outer end portions are oriented in the fore-and-aft direction. The wire bearing member 174 comprises a round bar member 174*a* provided with left and right bearing plates 174*b*. Portions in the vicinity of the two convex portions in the S-shape are borne from below by wire bearing faces f of the bearing plates 174*b*. Thus the operation wire 172 is borne and supported in a stable manner without drooping down.

The shift member 149 functions as a lock releasing operation member. When the inner rear end is shifted forward, the shift member 149 is rotated in reverse (clockwise in FIG. 10) against the spring 159. This rotation lets the shift member 149 be shifted backward by the action of the cam between the pins 157 and the inclined cam groove 158, and thus the abutting contact between the fixed friction plates 147 and the movable friction plates 178 is released.

Thus, while advancing at a fixed speed in which the forward speed is fixed by the speed setting lever 46, when pressing down the left and right brake pedals 166L and 166R at the same time in order to stop the vehicle, the shift member 149 is forcibly rotated in reverse as described above, in conjunction with this operation, to release the lock based on the frictional force, so that the rotation arm 154 is rotated to return backward by a spring 176, then the speed setting lever 46 is returned to the lock releasing position, and the speed change pedal 26 automatically returns to the neutral state with the applied neutrality recover force.

Next, the inner configuration of the transmission case 5 is described in detail with reference to FIGS. 15 to 18.

Figure 15:
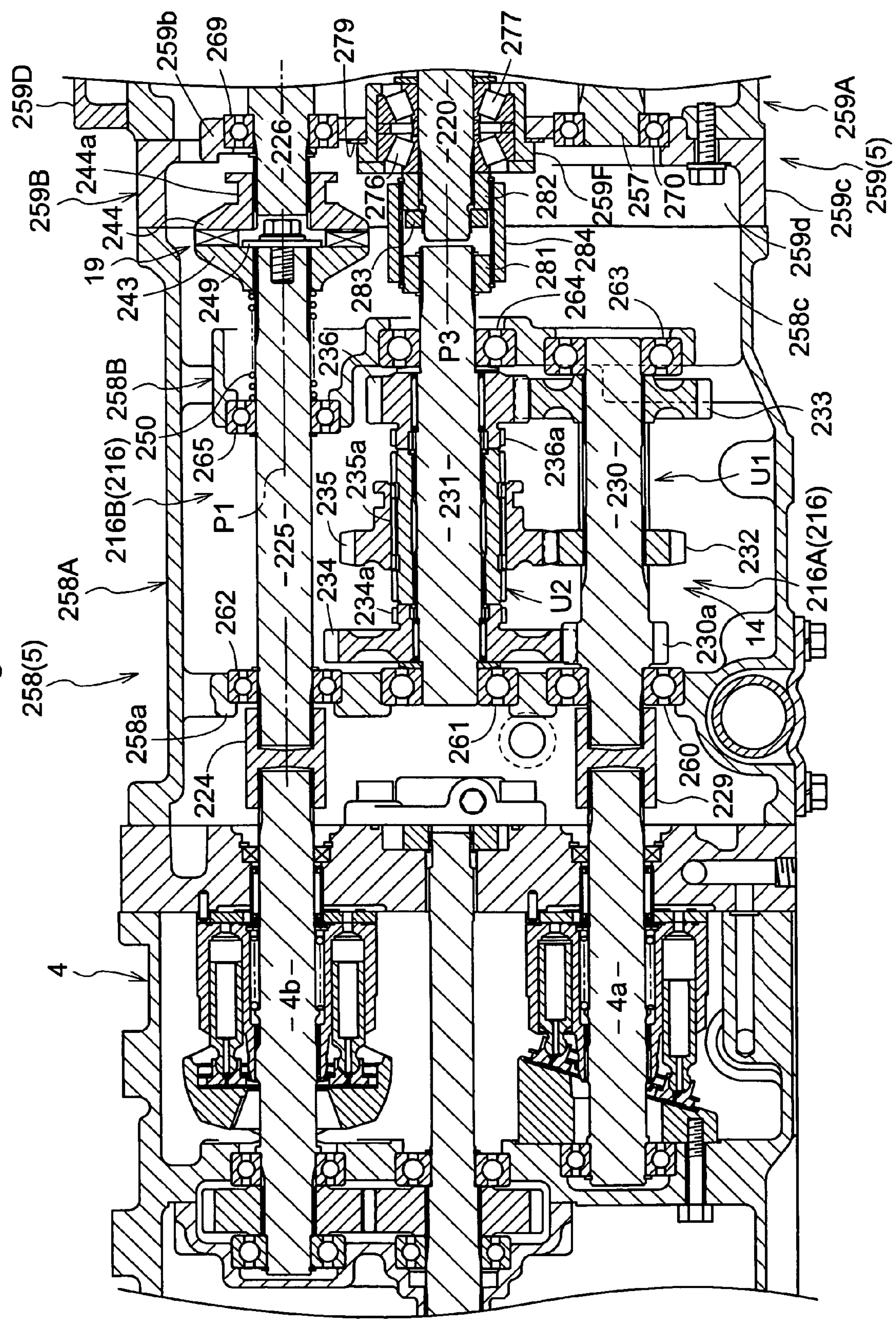
FIG. 15 is a vertical sectional lateral view showing the transmission configuration on the upstream side in a transmission case.

As shown in FIG. 15, a transmission system 216 is provided with a running transmission system 216A in which shifted motive power output from the motor shaft 4*a* of the hydrostatic continuously variable transmission 4 is transmitted, as motive power for driving the vehicle, to the left and right front wheels 8 and the left and right rear wheels 9, and an operation transmission system 216B in which unshifted motive power output from the pump shaft 4*b* of the hydrostatic continuously variable transmission 4 is transmitted as motive power for operation to the motive power take-off shaft 12. The running transmission system 216A comprises, for example, the geared transmission 14 functioning as the sub transmission for further shifting the motive power that has been shifted by the hydrostatic continuously variable transmission 4, a motive power distribution shaft 220 for distributing the motive power shifted by the geared transmission 14 between a front wheel driving system 218 and a rear wheel driving system 219, the front wheel clutch 15 for switching the transmission state from a front wheel driving gear (example of a transmission gear) 221 that rotates together with the motive power distribution shaft 220 to the left and right front wheels 8, and the rear wheel differential 16 in which the motive power from a spiral bevel pinion gear 220*a* for driving the rear wheels, formed in one piece with the rear end portion of the motive power distribution shaft 220, is distributed and supplied to the left and right rear wheels 9 with allowing differential transmission between the left and right rear wheels 9. The operation transmission system 216B comprises, for example, a first transmission shaft (an example of one transmission shaft) 225 operatively connected, via a coupling 224, to the pump shaft 4*b* of the hydrostatic continuously variable transmission 4, a second transmission shaft (example of the other transmission shaft) 226 arranged side by side with the first transmission shaft 225 in a straight line so as to have a common axis P1, the operation clutch (example of a clutch) 19 for switching the transmission state from the first transmission shaft 225 to the second transmission shaft 226, and the speed reducer 20 for reducing transmission from a small-diameter gear 226*a* formed in one piece in the middle portion of the second transmission shaft 226 to the motive power take-off shaft 12.

The geared transmission 14 is provided with, for example, a first speed change shaft (example of a transmission shaft) 230 operatively connected, via a coupling 229, to the motor shaft 4*a* of the hydrostatic continuously variable transmission 4, a second speed change shaft (example of a transmission shaft) 231 arranged side by side with the first speed change shaft 230 with a predetermined spacing between them such that they are in parallel, a first low speed gear 230*a* formed in one piece with the first speed change shaft 230, a first intermediate speed gear (example of a transmission gear) 232 and a first high speed gear (example of a transmission gear) 233 spline-fitted to the first speed change shaft 230 such that they rotate together with the first speed change shaft 230, a second low speed gear (example of a transmission gear) 234 supported such that it can rotate relative to the second speed change shaft 231 when meshing with the first low speed gear 230*a*, a second intermediate speed gear (example of a transmission gear) 235 spline-fitted to the second speed change shaft 231 such that it rotates together with the second speed change shaft 231 in a relatively slidable manner, and a second high speed gear (example of a transmission gear) 236 supported such that it can rotate relative to the second speed change shaft 231 when meshing with the first high speed gear 233. The second intermediate speed gear 235 is linked, via a link mechanism (not shown), to a sub speed change lever 237 (see FIG. 1) in the operator's section 7, and the speed is changed between three stages, that is, a low speed transmission state in which a meshing portion 235*a* formed in one piece with the second intermediate speed gear 235 meshes with a meshed portion 234*a* formed in one piece with the second low speed gear 234, an intermediate speed transmission state in which the second intermediate speed gear 235 meshes with the first intermediate speed gear 232, and a high speed transmission state in which the meshing portion 235*a* of the second intermediate speed gear 235 meshes with a meshed portion 236*a* formed in one piece with the second high speed gear 236, based on the operation of the sub speed change lever 237.

The front wheel clutch 15 is provided with, for example, a front wheel power shaft 238 projecting forward in the lower portion of the transmission case 5, and a sliding gear 239 spline-fitted to the front wheel power shaft 238 such that it rotates together with the front wheel power shaft 238 in a relatively slidable manner. The sliding gear 239 is linked to operation tools (not shown) arranged in the operator's section 7, and it is possible to switch between a transmission-on state in which the sliding gear 239 meshes with an intermediate gear (example of a transmission gear) 240 interlocked with the front wheel driving gear 221 and a transmission-off state in which the meshing between the sliding gear 239 and the intermediate gear 240 is released, based on the operation of the operation tools.

Subsequently, the motive power taken off from the front wheel power shaft 238 is distributed and transmitted, via, for example, the front wheel transmission shaft 17 and the front wheel differential 18, to the left and right front wheels 8 with allowing differential transmission therebetween.

In other words, the front wheel driving gear 221, the intermediate gear 240, the front wheel clutch 15, the front wheel transmission shaft 17, the front wheel differential 18, for example, constitute the front wheel driving system 218 for transmitting motive power from the motive power distribution shaft 220 to the left and right front wheels 8, as motive power for driving the front wheels.

On the other hand, the spiral bevel pinion gear 220*a* of the motive power distribution shaft 220 and the rear wheel differential 16, for example, constitute the rear wheel driving system 219 for transmitting motive power from the motive power distribution shaft 220 to the left and right rear wheels 9, as motive power for driving the rear wheels.

The intermediate gear 240 employs a two-stage gear provided with a small-diameter gear portion 240*a* meshing with the front wheel driving gear 221 and a large-diameter gear portion 240*b* meshing with the sliding gear 239.

Figure 16:
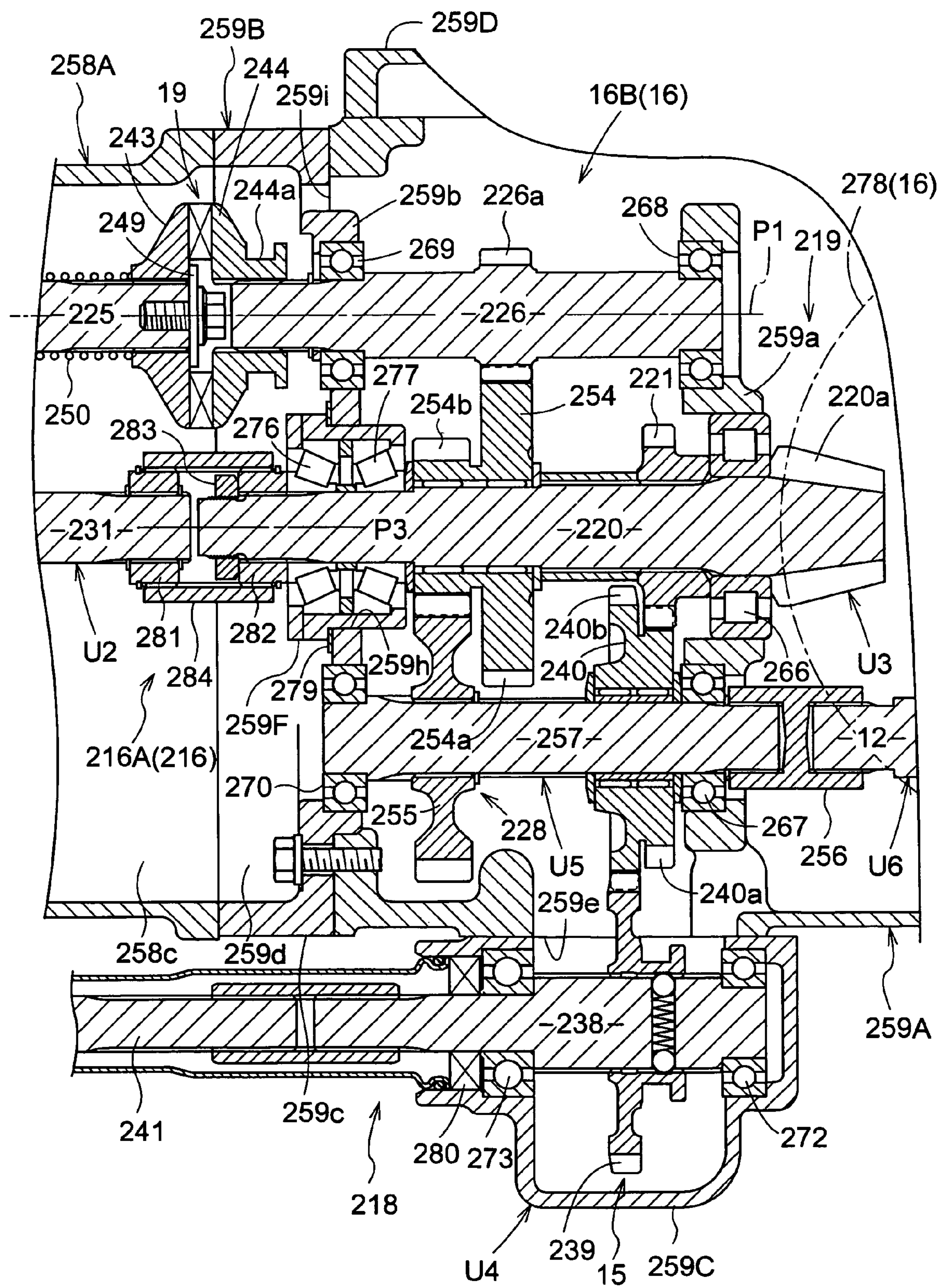
FIG. 16 is a vertical sectional lateral view showing the transmission configuration on the middle portion in the transmission case.
Figure 18:
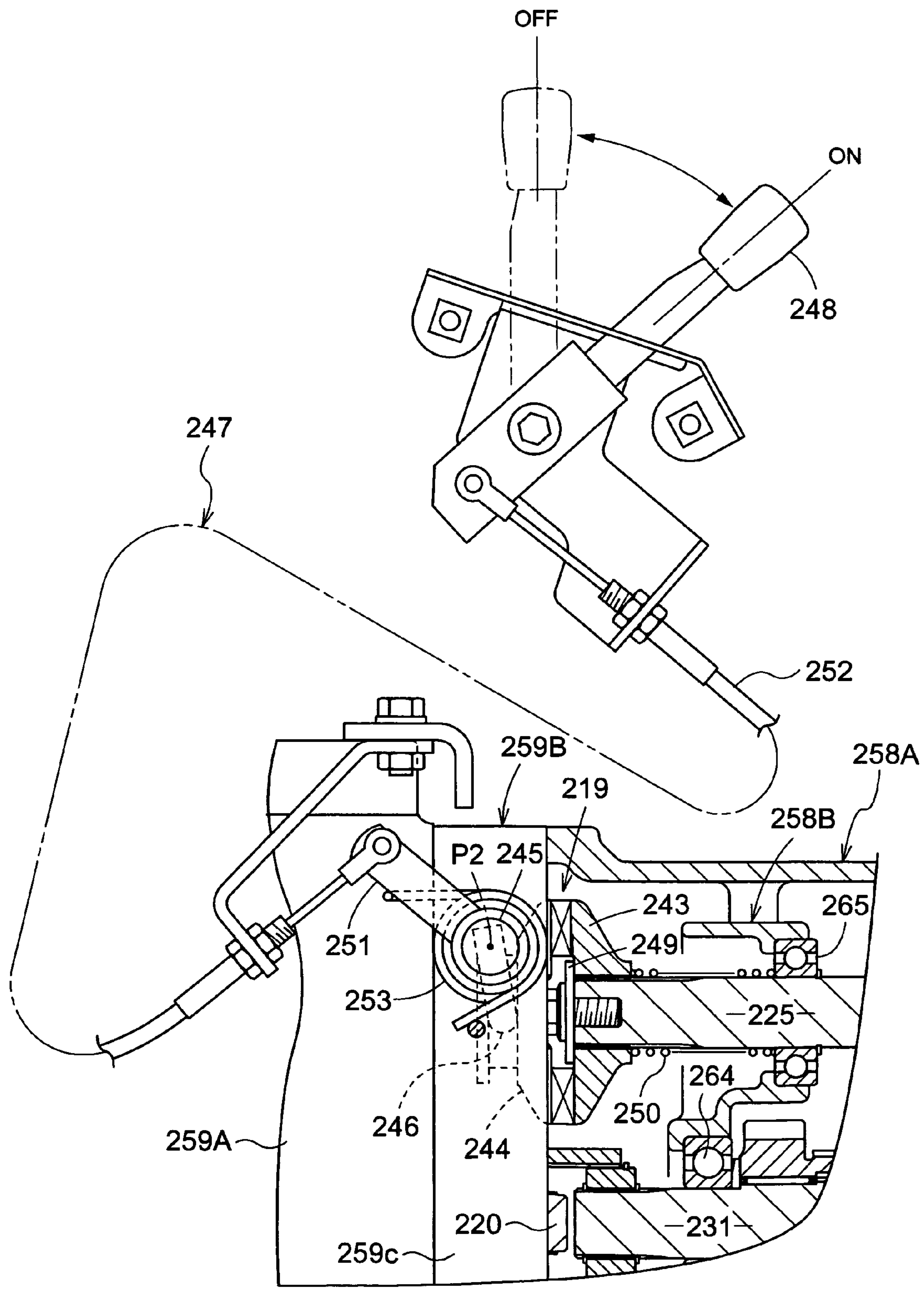
FIG. 18 is a vertical sectional lateral view of a relevant part of an operation clutch configuration.
Figure 19:
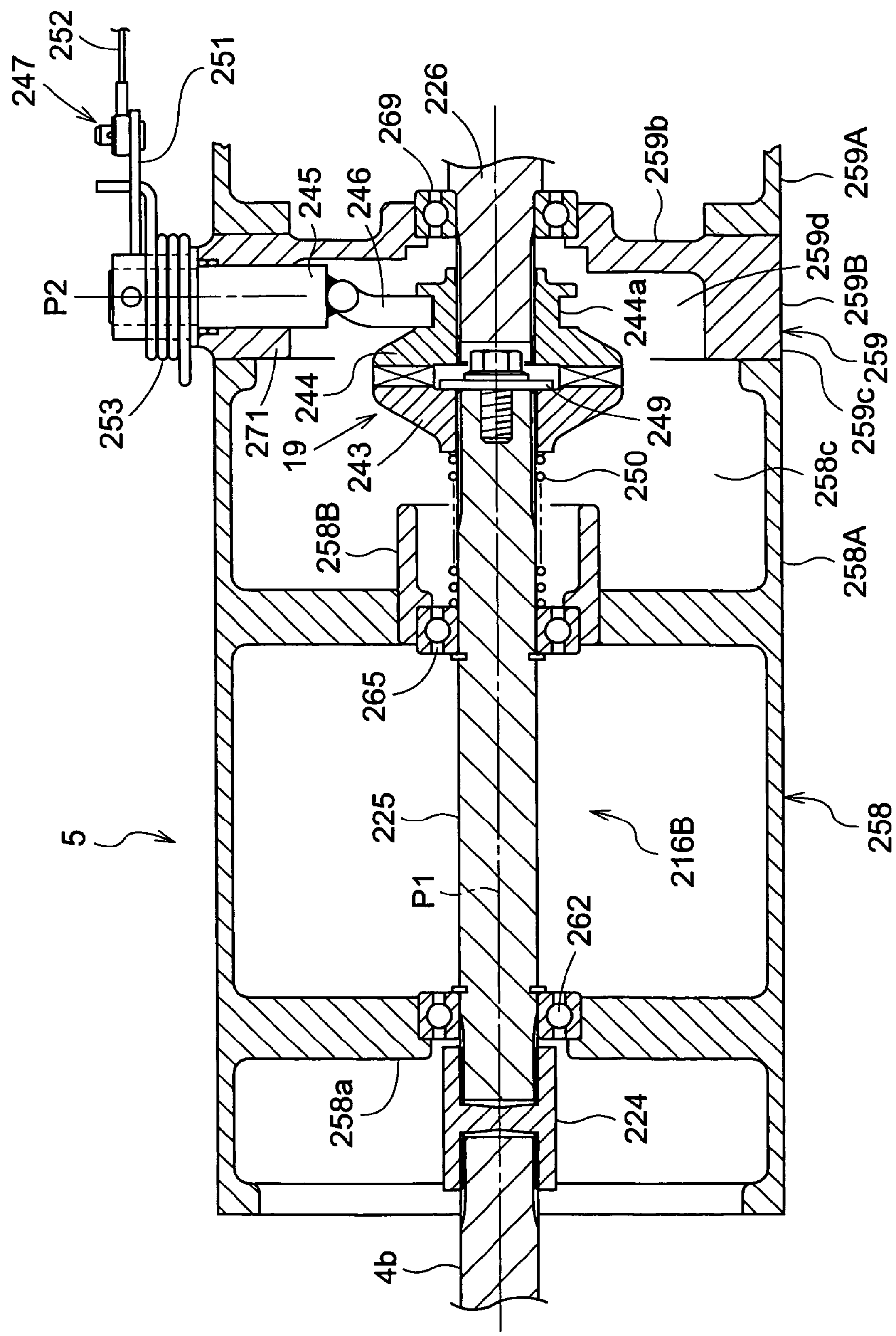
FIG. 19 is a lateral sectional plan view of a relevant part of the operation clutch configuration.

As shown in FIGS. 16, 18, and 19, the operation clutch 19 comprises, for example, a connected portion 243 spline-fitted to the first transmission shaft 225 such that it rotates together with the first transmission shaft 225 in a relatively slidable manner, a connecting portion 244 spline-fitted to the second transmission shaft 226 such that it rotates together with the second transmission shaft 226 in a relatively sidable manner, an operation shaft 245 supported such that it can rotate relative to the transmission case 5, and a link member 246 linking the connecting portion 244 and the operation shaft 245. The operation shaft 245 is linked, via a link mechanism 247, to a PTO clutch lever 248 provided in the operator's section 7.

Each of the connected portion 243 and the connecting portion 244 is constituted by a surmounting cam, and one surmounting cam constituting the connected portion 243 is prevented from dropping off by a cam bearing washer 249 bolted to the end portion of the first transmission shaft 225 on the side of the second transmission shaft 226, and is biased to mesh with the connecting portion 244 by an extension spring 250 fitted to the first transmission shaft 225. An annular groove 244*a* for linking is formed on the outer circumferential portion on the rear portion side in the other surmounting cam constituting the connecting portion 244. The orientation of the operation shaft 245 is set such that its axis P2 is in the direction perpendicular to the axis P1 of the second transmission shaft 226, and the operations shaft 245 rotates about the axis P2 with respect to the transmission case 5. The link member 246 is made of a round bar steel member bent into an L-shape, its one end portion is welded to the operation shaft 245, and the other end portion is inserted into the annular groove 244*a* of the connecting portion 244. The link member 246 swings about the axis P2 in accordance with the rotation of the operation shaft 245 about the axis P2, so as to slide the connecting portion 244 along the axis P1 of the second transmission shaft 226.

Figure 17:
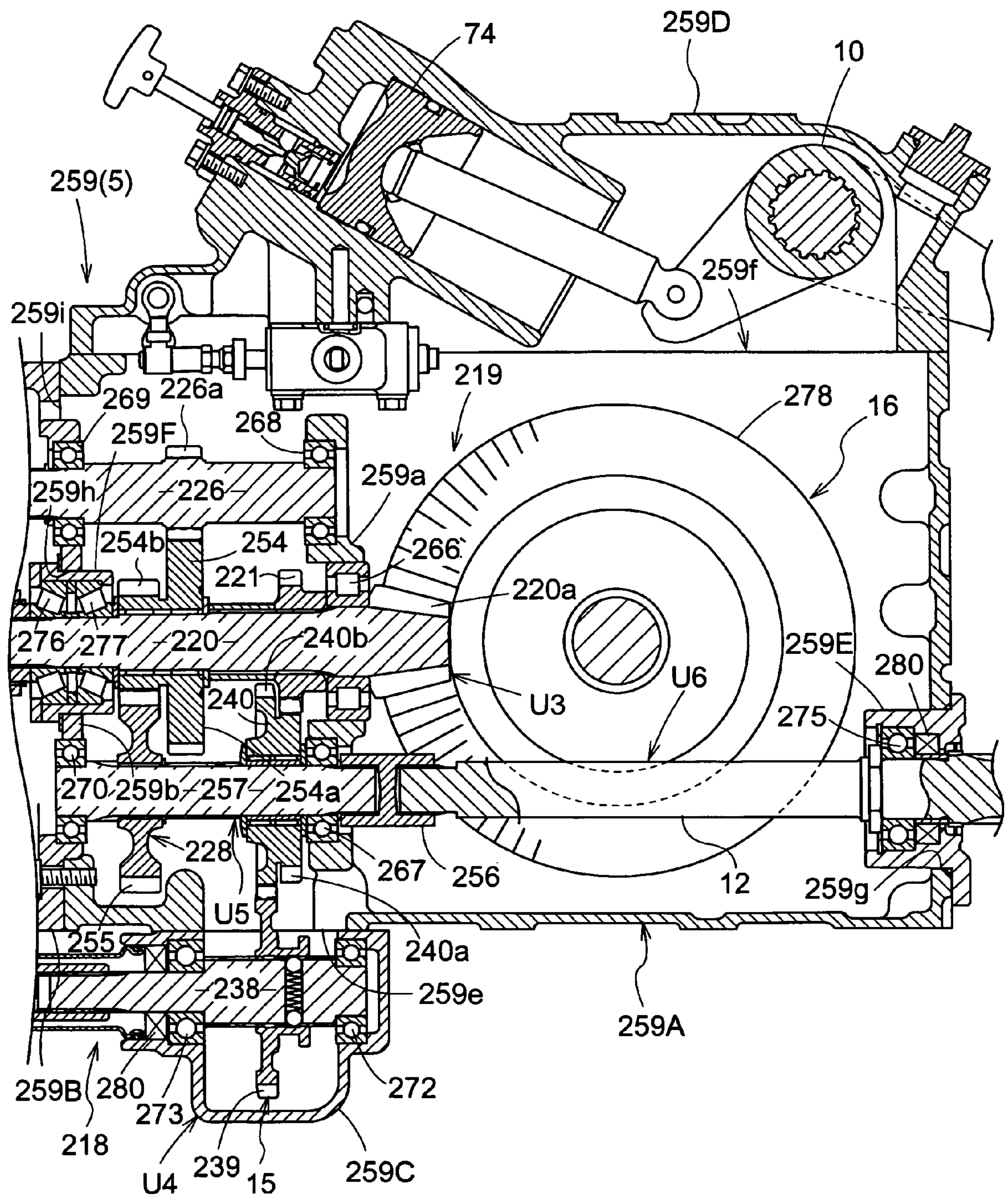
FIG. 17 is a vertical sectional lateral view showing the transmission configuration on the downstream side in the transmission case.

As shown in FIGS. 17 and 18, the link mechanism 247 links the PTO clutch lever 248 and the operation shaft 245 in such a manner that when turning the PTO clutch lever 248 from the off-position to the on-position with a swing arm 251 pin-connected to the outer end portion of the operation shaft 245, an operation wire 252 between the swing arm 251 and the PTO clutch lever 248, and a torsion spring 253 biasing the swing arm 251 by swinging such that the operation shaft 245 rotates in the direction to move the connecting portion 244 apart from the connected portion 243, for example, the operation shaft 245 is rotated against the spring force of the torsion spring 253, and when turning the PTO clutch lever 248 from the on-position to the off-position, the operation shaft 245 is rotated by the spring force of the torsion spring 253.

More specifically, the operation clutch 19 is configured so as to switch between the transmission-on state in which the connecting portion 244 contacts the connected portion 243 to operatively connect the first transmission shaft 225 and the second transmission shaft 226 with each other and the transmission-off state in which the connecting portion 244 is parted from the connected portion 243 to release the operative connection between the first transmission shaft 225 and the second transmission shaft 226, in accordance with the operation of the PTO clutch lever 248, and so as to transmit motive power of the engine from the first transmission shaft 225 to the second transmission shaft 226 with allowing the excessive rotation of the second transmission shaft 226 with respect to the first transmission shaft 225 due to the inertial force of the operation devices in the transmission-on state. With this configuration, it is possible to prevent, for example, the hydrostatic continuously variable transmission 4 from being damaged due to the inertial force of the operation devices.

As shown in FIGS. 16 and 17, the speed reducer 20 comprises, for example, a first speed reducing gear (example of a transmission gear) 254 supported such that it can rotate relative to the motive power distribution shaft 220 when meshing with the small-diameter gear 226*a* of the second transmission shaft 226, a second speed reducing gear (example of a transmission gear) 255 meshing with the first speed reducing gear 254, and a speed reducing shaft (example of a transmission shaft) 257 that is spline-fitted to the second speed reducing gear 255 so as to rotate in one piece therewith and that is operatively connected, via a coupling 256, to the motive power take-off shaft 12.

The first speed reducing gear 254 employs a two-stage gear provided with a large-diameter gear portion 254*a* meshing with the small-diameter gear 226*a* of the second transmission shaft 226 and a small-diameter gear portion 254*b* meshing with the second speed reducing gear 255. Furthermore, the intermediate gear 240 of the front wheel driving system 218 is fitted to and attached to the speed reducing shaft 257 in a relatively rotatable manner.

For example, as shown in FIGS. 15-17, the transmission case 5 is configured such that it can be divided into an upstream side case portion 258 for accommodating components, such as the geared transmission 14 in the running transmission system 216A and the first transmission shaft 225 in the operation transmission system 216B, positioned on the upstream side of the transmission system 216 in the transmission direction, and the downstream side case portion 259 (also referred to as "differential housing") for accommodating components, such as the motive power distribution shaft 220 and rear wheel differential 16 in the running transmission system 216A and the second transmission shaft 226 and the speed reducer 20 in the operation transmission system 216B, positioned on the downstream side of the transmission system 216 in the transmission direction. The position dividing the case portions is set to be the same as the position at which the connected portion 243 and the connecting position 244 are connected to each other in the operation clutch 19.

The upstream side case portion 258 comprises an upstream side case body 258A encompassing, for example, the geared transmission 14 and the first transmission shaft 225, and a wall-shaped bearing holder (example of a support member) 258B bolted to the upstream side case body 258A on the side of the downstream side case portion 259 in a removable manner. The upstream side case body 258A is provided with a wall-shaped bearing holder portion (example of a support portion) 258*a*, formed in one piece therewith, for supporting the shaft end portions, located on the side away from the downstream side case portion 259, of the speed change shafts 230 and 231 of the geared transmission 14 and the first transmission shaft 225, via respectively corresponding bearings 260 to 262. The bearing holder 258B is formed so as to support the shaft end portions, located on the side of the downstream side case portion 259, of the speed change shafts 230 and 231 of the geared transmission 14 and the first transmission shaft 225, via respectively corresponding bearings 263 to 265.

The downstream side case portion 259 comprises, for example, a downstream side case body 259A encompassing the motive power distribution shaft 220, the second transmission shaft 226, the rear wheel differential 16, and other components, a bearing holder (example of a support member) 259B bolted to the downstream side case body 259A on the side of the upstream side case portion 258 in a removable manner, an auxiliary case 259C bolted to the bottom wall portion of the downstream side case body 259A in a removable manner, a cylinder case 259D bolted to the top wall portion of the downstream side case body 259A in a removable manner, a first bearing case 259E bolted to the rear wall portion of the downstream side case body 259A in a removable manner, and a second bearing case 259F bolted to the bearing holder 259B in a removable manner. The downstream side case body 259A is provided with a wall-shaped bearing holder portion (example of a support portion) 259*a*, formed in one piece therewith, for supporting the shaft end portions, located on the side away from the upstream side case portion 258, of the motive power distribution shaft 220, the second transmission shaft 226, and the speed reducing shaft 257 of the speed reducer 20, via respectively corresponding bearings 266 to 268.

The bearing holder 259B is formed in the shape of a spacer provided with a support wall 259*b* for supporting the shaft end portions, located on the side of the upstream side case portion 258, of the second transmission shaft 226, and the speed reducing shaft 257 of the speed reducer 20, via respectively corresponding bearings 269 and 270, and a circumferential wall 259*c* between the downstream side case body 259A and the upstream side case portion 258. An inner space 259*d* thereof is used as an accommodation space for accommodating a portion from the end side connected to the upstream side case portion 258 to the connecting portion 244 of the operation clutch 19, and a support portion 271 for supporting the operation shaft 245 of the operation clutch 19 in a relatively rotatable manner is formed on the circumferential wall 259*c*.

The auxiliary case 259C is formed so as to support the front wheel power shaft 238 of the front wheel clutch 15 via a pair of bearings 272 and 273, so as to encompass the front wheel clutch 15 from the bottom, and so as to close an opening 259*e* for taking off the front wheel driving force formed on the bottom wall portion of the downstream side case body 259A in accordance with the connection to the bottom wall portion.

The cylinder case 259D is formed so as to support the pair of left and right lift arms 10 such that they can pivot up and down, so as to include a hydraulic cylinder 74 for swinging and driving the lift arms 10, and so as to close an opening 259*f* formed on the top wall portion of the downstream side case body 259A such that the upper portion of the rear wheel differential 16 is widely opened in accordance with the connection to the top wall portion.

The first bearing case 259E is formed so as to support the motive power take-off shaft 12 via a bearing 75, and so as to close an opening 259*g* for taking off the operation motive power formed on the rear wall portion of the downstream side case body 259A in accordance with the connection to the rear wall portion.

The second bearing case 259F is formed so as to support the shaft end portion, located on the side of the upstream side case portion 258, of the motive power distribution shaft 220 via a pair of bearings 276 and 277, and so as to close an opening 259*h* for running transmission formed on the bearing holder 259B in accordance with the connection to the bearing holder 259B. A shim 279 for adjusting the position of the spiral bevel pinion gear 220*a* provided in the motive power distribution shaft 220 with respect to a spiral bevel pinion gear 278 of the rear wheel differential 16, in the direction along an axis P3 of the motive power distribution shaft 220, is placed between the bearing holder 259B and the second bearing case 259F.

The transmission system 216 is capable of constituting six transmission units U1 to U6 in advance. Among the transmission units U1 to U6, the first transmission unit U1 is configured by disposing, for example, the first intermediate speed gear 232 and the first high speed gear 233 at predetermined positions of the first speed change shaft 230, the second transmission unit U2 is configured by disposing, for example, the second low speed gear 234, the second intermediate speed gear 235, and the second high speed gear 236 at predetermined positions of the second speed change shaft 231, the third transmission unit U3 is configured by disposing, for example, the front wheel driving gear 221 and the first speed reducing gear 254 at predetermined positions of the motive power distribution shaft 220, the fourth transmission unit U4 is configured by letting the auxiliary case 259C support the front wheel power shaft 238 provided with, for example, the sliding gear 239, the fifth transmission unit U5 is configured by disposing, for example, the intermediate gear 240 and the second speed reducing gear 255 at predetermined positions of the speed reducing shaft 257, and the sixth transmission unit U6 is configured by letting the first bearing case 259E support the motive power take-off shaft 12.

Oil seals 280 are placed between the auxiliary case 259C and the front wheel power shaft 238 in the fourth transmission unit U4 and between the first bearing case 259E and the motive power take-off shaft 12 in the sixth transmission unit U6.

Based on the above-described configuration, the following procedure is taken when installing the transmission system 216 in the transmission case 5. First, the first to the sixth transmission units U1 to U6 are constituted respectively for the shafts 12, 220, 230, 231, 238, and 257 for transmission, based on which units can be made in the transmission system 216.

Next, the first transmission shaft 225, the first transmission unit U1, and the second transmission unit U2 are installed in the upstream side case body 258A of the upstream side case portion 258, from an opening (an opening of the upstream side case portion 258) 258*b* formed at the end dividing the upstream side case body 258A and the downstream side case portion 259, in such a manner that the shaft end portion, located on the side away from the downstream side case portion 259, of the first transmission shaft 225, the shaft end portion, located on the side away from the downstream side case portion 259, of the speed change shaft 230 of the first transmission unit U1, and the shaft end portion, located on the side away from the downstream side case portion 259, of the second speed change shaft 231 of the second transmission unit U2 are supported by the bearing holder portion 258*a* of the upstream side case body 258A via the respectively corresponding bearings 260 to 262.

After the installation, the bearing holder 258B is bolted to the upstream side case body 258A such that the shaft end portions, located on the side of the downstream side case portion 259, of the first transmission shaft 225, the first speed change shaft 230, and the second speed change shaft 231 are supported by the bearing holder 258B via the respectively corresponding bearings 263 to 265, and the upstream side case portion 258 is thus constituted.

After the connection, as for the shaft end portion of the first transmission shaft 225 projecting from the bearing holder 258B, the extension spring 250 and the connected portion 243 are fitted therein, and the washer 249 is bolted thereto. Further, a spline boss 281 is fitted and attached to the shaft end portion of the second speed change shaft 231 projecting from the bearing holder 258B so as to rotate in one piece in a relatively unslidable manner.

On the other hand, first, the rear wheel differential 16 is installed in the downstream side case body 259A of the downstream side case portion 259 from the opening 259*f* formed on the top wall portion thereof.

After the installation, the second transmission shaft 226, the third transmission unit U3, and the fifth transmission unit U5 are installed from an opening (an opening of the downstream side case portion 259) 259*i* formed at the end dividing the downstream side case body 259A and the upstream side case portion 258 in such a manner that the shaft end portion, located on the side away from the upstream side case portion 258, of the second transmission shaft 226, the shaft end portion, located on the side away from the upstream side case portion 258, of the motive power distribution shaft 220 of the third transmission unit U3, and the shaft end portion, located on the side away from the upstream side case portion 258, of the speed reducing shaft 257 of the fifth transmission unit U5 are supported by the bearing holder portion 259*a* of the downstream side case body 259A via the respectively corresponding bearings 266 to 268. Further, the operation shaft 245 provided with the link member 246 is installed in the support portion 271 of the bearing holder 259B.

After the installation, the bearing holder 259B is bolted to the downstream side case body 259A in such a manner that the shaft end portions, located on the side of the upstream side case portion 258, of the second transmission shaft 226, the motive power distribution shaft 220, and the speed reducing shaft 257 are supported by the support wall 259*b* of the bearing holder 259B via the respectively corresponding bearings 269 and 270, or the second bearing case 259F and the pair of bearings 276 and 277. The position adjustment is performed with the shim 279 placed between the support wall 259*b* of the bearing holder 259B and the second bearing case 259F such that the spiral bevel pinion gear 220*a* of the motive power distribution shaft 220 is positioned at an appropriate position with respect to the spiral bevel pinion gear 278 of the rear wheel differential 16, and then the second bearing case 259F is bolted to the support wall 259*b* of the bearing holder 259B.

After the installation, the connecting portion 244 is fitted to and attached to the shaft end portion of the second transmission shaft 226 projecting from the support wall 259*b* of the bearing holder 259B, the free end of the link member 246 is engaged with the annular groove 244*a* of the connecting portion 244, and a spline boss 282 is spline-fitted to the shaft end portion of the motive power distribution shaft 220 projecting from the bearing holder 259B so as to rotate in one piece, and is fastened with a nut 283.

Next, the fourth transmission unit U4 is bolted to the bottom wall portion of the downstream side case body 259A such that the sliding gear 239 passing through from the opening 259*e* on the bottom wall portion can mesh with the intermediate gear 240, and the sixth transmission unit U6 is bolted to the rear wall portion of the downstream side case body 259A such that the motive power take-off shaft 12 passing through from the opening 259*g* on the rear wall portion is operatively connected, via the coupling 256, to the speed reducing shaft 257. After the connection, the cylinder case 259D is bolted to the top wall portion of the downstream side case body 259A to close the opening 259*f* formed on the top wall portion, and the downstream side case portion 259 is thus constituted.

Subsequently, when the upstream side case portion 258 and the downstream side case portion 259 obtained in the above installation are bolted to each other such that the connecting portion 244 can be connected to the connected portion 243, and that the spline boss 281 on the side of the second speed change shaft 231 is connected, via the coupling 284, to the spline boss 282 on the side of the motive power distribution shaft 220 to interlock the second speed change shaft 231 and the motive power distribution shaft 220 with each other, a configuration can be realized in which while forming the transmission case 5, the transmission system 216 is installed in the transmission case 5, and the operation clutch 19 for switching the transmission state between the first transmission shaft 225 and the second transmission shaft 226 is capable of performing the operation in which the connecting portion 244 is connected to and released from the connected portion 243 via the link member 246 based on the rotation of the operation shaft 245.

In other words, among the transmission system 216 included in the transmission case 5, components such as the geared transmission 14 of the running transmission system 216A and the first transmission shaft 225 of the operation transmission system 216B accommodated on the upstream side in the transmission case 5 in the transmission direction can be easily installed from the opening 258*b* formed at the end dividing the upstream side case portion 258 and the downstream side case portion 259.

On the other hand, among components such as the rear wheel differential 16 of the running transmission system 216A, and the second transmission shaft 226 the speed reducer 20 of the operation transmission system 216B accommodated on the downstream side in the transmission case 5 in the transmission direction, it is possible to easily install the rear wheel differential 16 of the running transmission system 216A positioned on the most downstream side in the transmission direction from the opening 259*f* formed above the rear wheel differential 16 in the downstream side case portion 259, and the motive power take-off shaft 12 of the operation transmission system 216B from the opening 259*g* formed on the rear wall portion of the downstream side case portion 259. Further, the motive power distribution shaft 220 of the running transmission system 216A and the speed reducer 20 of the operation transmission system 216B, for example, which are positioned on the upstream side of the rear wheel differential 16 and the motive power take-off shaft 12 in the transmission direction, can be easily installed from the opening 259*i* formed at the end dividing the downstream side case portion 259 and the upstream side case portion 258.

In addition, the installation is performed after constituting the first to the sixth transmission units U1 to U6 respectively for the shafts 12, 220, 230, 231, 238, and 257 for transmission, based on which units can be made, and thus the installation efficiency is significantly improved compared with a case in which units are not made and each of them is installed one by one.

Furthermore, the space for accommodating the operation clutch 19 operated based on the rotation of the operation shaft 245 perpendicular to the first transmission shaft 225 and the second transmission shaft 226 is formed by an open space 258*c* of the upstream side case portion 258 and an open space 259*d* of the downstream side case portion 259, which are positioned between the bearing holder 258B of the upstream side case portion 258 and the bearing holder 259B of the downstream side case portion 259 in the transmission case 5, and the support portion 271 for supporting the operation shaft 245 in a relatively rotatable manner is formed on the circumferential wall 259*c* of the bearing holder 259B forming the open space 259*d* of the downstream side case portion 259 accommodating the connecting portion 244 linked via the link member 246 to the operation shaft 245. Thus, the connected portion 243 and other components can be installed with respect to the first transmission shaft 225, the connecting portion 244 can be installed with respect to the second transmission shaft 226, and the connecting portion 244 can be operatively connected, via the link member 246, to the operation shaft 245 set to be oriented perpendicularly to the direction in which the connecting portion 244 moves, easily from the respective open ends of the open spaces 258*c* and 259*d*.

Since the transmission system 216 can be installed easily in the transmission case 5 following the installing procedure described above, it is possible to perform the installation processes in an assembly-line system, and to increase the speed of the assembly-line, resulting in the effective improvement of the productability.

Herein, the first transmission shaft 225 of the transmission system 216 is operatively connected, via the coupling 224, to the pump shaft 4*b* of the hydrostatic continuously variable transmission 4, and the first speed change shaft 230 of the transmission system 216 is operatively connected, via the coupling 229, to the motor shaft 4*a* of the hydrostatic continuously variable transmission 4, when the hydrostatic continuously variable transmission 4 is bolted to the front end portion of the transmission case 5.

Other Embodiments

Hereinafter, other embodiments of the present invention are listed.

(1) The working vehicles may be, for example, mowers or transport vehicles.

(2) A configuration may be adopted in which only the biasing means 41C of the neutral bias mechanism 41 and the neutrality detecting means 45 arranged inside the steering post 22 are arranged above the step surface 21A of the riding step 21.

(3) The neutral bias mechanism 41 may be configured such that the neutral bias mechanism 41 can perform the neutrality adjustment with respect to the neutral state of the speed change actuation shaft 4*c*, by forming the cam portion 41A in one piece with the speed change arm 38, by providing a supporting point portion of the operation member 41B with a position adjustment mechanism constituted from, for example, an eccentric cam for adjusting the position of the supporting point, and by adjusting the position of the supporting point with the eccentric cam of the point adjustment mechanism, so as to adjust the position at which the operation member presses against the cam portion.

(4) As the link member for forcibly releasing the shift member 149 as a lock releasing operation member in the speed lock mechanism 145 in conjunction with the operation of stopping the vehicle performed with the brake pedals 166L and 166R, a link mechanism may be used other than the operation wire 172 as described above.

(5) A continuously variable transmission operated with a pedal is not limited to the hydraulic type, and it is possible to use various types of continuously variable transmissions such as the belt type and the friction type, or a multi-typed continuously variable transmission utilizing them in combination.

(6) In the foregoing embodiment, the clutch 19 in the present invention is employed as the operation clutch 19, as one example, but the clutch 19 may be also employed as, for example, the front wheel clutch 15.

(7) The clutch 19 may be the multi-disk type or the meshing hooking type, other than the cam type shown as one example in the foregoing embodiment.

(8) The operation clutch 19 may be configured such that the connecting portion 244 is attached to the first transmission shaft 225 accommodated in the upstream side case portion 258, the connected portion 243 is attached to the second transmission shaft 226 accommodated in the downstream side case portion 259, and the support portion 271 for supporting, in a relatively rotatable manner, the operation shaft 245 linked via the link member 246 to the connecting portion 244 is provided in the upstream side case portion 258 accommodating the first transmission shaft 225.

(9) The downstream side case portion 259 may be configured such that the bearing holder (support member) 259B is not provided with the circumferential wall 259*c* and that the downstream side case body 259A is formed to be a long portion having a circumferential wall portion corresponding to the circumferential wall 259*c*.

(10) A configuration may be adopted in which the downstream side case body 259A of the downstream side case portion 259 accommodates, for example, the front wheel power shaft 238 and the sliding gear 239, and then the front wheel power shaft 238, the sliding gear 239, and other components are combined into a unit and installed from the opening 259*i* formed at the end dividing the downstream side case body 259A and the upstream side case portion 258.

(11) The position at which the upstream side case portion 258 and the downstream side case portion 259 are divided from each other in the transmission case 5 may be substantially the same as the position at which the connected portion 243 and the connecting portion 244 are connected to each other in the operation clutch 19.

What is claimed is:

1. A working vehicle provided with a hydraulic continuously variable transmission, comprising:
- a plurality of wheels;
- a vehicle body supported by the plurality of wheels, wherein the hydraulic continuously variable transmission is supported by the vehicle body, and has a speed change actuation shaft;
- a speed change pedal operatively linked to the speed change actuation shaft for controlling the speed change actuation shaft;
- a neutral bias mechanism for biasing the speed change actuation shaft toward a neutral position, comprising:
  - a cam portion that pivots together with the speed change actuation shaft;
  - an operation member that abuts against the cam portion; and
  - a biasing means for biasing the operation member toward the cam portion, wherein the biasing means is disposed above a step surface of a riding step; and
- a neutral detecting switch for detecting a neutral state of the speed change actuation shaft via the operation member, wherein the neutral detecting switch is disposed above the step surface.

2. The working vehicle according to claim 1, wherein the biasing means and the neutral detecting switch are supported by a member disposed above the front of the hydraulic continuously variable transmission.

3. The working vehicle according to claim 2, wherein the member disposed above the front of the hydraulic continuously variable transmission is a steering post supporting a steering wheel.

4. The working vehicle according to claim 3, wherein the biasing means and the neutral detecting switch are arranged within the steering post.

5. The working vehicle according to claim 1, wherein the biasing means and the neutral detecting switch are arranged within a steering post.

6. The working vehicle according to claim 1, further comprising:
- an operation arm that pivots together with the speed change pedal, a speed change arm that is fixed on the speed change actuation shaft and to which the cam portion is fixed, and a link rod that links the operation arm and the speed change arm.

7. The working vehicle according to claim 6, wherein the cam portion is connected to the speed change arm such that a position of the cam portion can be adjusted with respect to the speed change arm about the speed change actuation shaft.

8. The working vehicle according to claim 6, wherein the speed change arm has a weight for reducing vibration of the hydraulic continuously variable transmission.

9. The working vehicle according to claim 1, wherein the speed change actuation shaft is disposed above the step surface.

10. The working vehicle according to claim 1, further comprising:
- a speed lock mechanism that is provided on one side on the vehicle body in a lateral direction, and that retains the hydraulic continuously variable transmission at a desired speed change position;
- a brake pedal provided on the other side on the vehicle body from the speed lock mechanism;
- a lock releasing operation member for releasing the speed lock mechanism in response to a braking operation by the brake pedal; and
- a link member disposed below and laterally across the vehicle body in order to operatively link the brake pedal and the lock releasing operation member, wherein the link member is disposed in a space between the vehicle body and a transmission shaft, for driving the front wheels, extending forward from a rear lower portion of the vehicle body.

11. The working vehicle according to claim 10, wherein the link member is an operation wire, and a wire bearing member for supporting the operation wire from a below is disposed in a lower portion of the vehicle body.

12. The working vehicle according to claim 11, wherein the operation wire is bent into an S-shape in plan view, and a wire bearing face for supporting portions in the vicinity of two convex portions of the S-shape from a bottom is disposed on the wire bearing member.

13. The working vehicle according to claim 1, wherein the step surface of the riding step defines a generally flat horizontal surface that an operator of the working vehicle rests his foot on.

14. The working vehicle according to claim 1, wherein the speed change pedal has a portion adapted to abut a foot of an operator and an operatively linked portion that is operatively linked to the speed change actuation shaft and wherein the riding step has an opening for the operatively linked portion to extend through.

15. The working vehicle according to claim 1, wherein the biasing means is a biasing coil spring which extends generally vertically such that the biasing coil spring is housed within a steering post that is arranged vertically at a location forwardly and above the continuously variable transmission.

* * * * *